US008892569B2

(12) United States Patent
Bowman et al.

(10) Patent No.: US 8,892,569 B2
(45) Date of Patent: Nov. 18, 2014

(54) INDEXING SPATIAL DATA WITH A QUADTREE INDEX HAVING COST-BASED QUERY DECOMPOSITION

(75) Inventors: Ivan Thomas Bowman, Hammonds Plains NS (CA); David Edward De Haan, Waterloo (CA)

(73) Assignee: iAnywhere Solutions, Inc., Dublin, CA (US)

( * ) Notice: Subject to any disclaimer, the term of this patent is extended or adjusted under 35 U.S.C. 154(b) by 1000 days.

(21) Appl. No.: 12/977,707

(22) Filed: Dec. 23, 2010

(65) Prior Publication Data

US 2012/0166446 A1    Jun. 28, 2012

(51) Int. Cl.
    *G06F 17/30* (2006.01)
(52) U.S. Cl.
    CPC .... *G06F 17/30241* (2013.01); *G06F 17/30327* (2013.01)
    USPC ......................................................... 707/743
(58) Field of Classification Search
    USPC ......................................................... 707/743
    See application file for complete search history.

(56) References Cited

U.S. PATENT DOCUMENTS

| 6,381,241 | B1 | 4/2002 | Ghirnikar et al. |
| 6,983,293 | B2 | 1/2006 | Wang |
| 7,853,561 | B2 | 12/2010 | Holenstein et al. |
| 7,882,062 | B2 | 2/2011 | Holenstein et al. |
| 7,962,458 | B2 | 6/2011 | Holenstein et al. |
| 8,037,056 | B2 | 10/2011 | Naicken et al. |
| 8,086,661 | B2 | 12/2011 | Holenstein et al. |
| 2002/0051560 | A1* | 5/2002 | Donescu et al. ............. 382/100 |
| 2003/0110085 | A1 | 6/2003 | Murren et al. |
| 2004/0001498 | A1 | 1/2004 | Chen et al. |
| 2004/0133599 | A1 | 7/2004 | Warren et al. |
| 2004/0133644 | A1 | 7/2004 | Warren et al. |

(Continued)

FOREIGN PATENT DOCUMENTS

| KR | 2003/0072693 A | 9/2003 |
| KR | 2006/0060629 A | 6/2006 |
| KR | 2011/0074059 A | 6/2011 |

OTHER PUBLICATIONS

Aboulnaga, A., and Aref, W. G., "Window Query Processing in Linear Quadtrees," *Distributed and Parallel Databases*, vol. 10, pp. 111-126 (2001).

(Continued)

*Primary Examiner* — Khanh Pham
*Assistant Examiner* — Reza Hosseini
(74) *Attorney, Agent, or Firm* — Sterne, Kessler, Goldstein & Fox P.L.L.C.

(57) ABSTRACT

Approaches for indexing and retrieving spatial data with a quadtree index in database management systems are described. In an embodiment, data objects are stored without decomposition within a linearized quadtree stored within a B-tree index. In another embodiment, a method determines an optimal execution plan for a spatial query by parsing it to determine a query type and geometry object associated with the query. The method tessellates the query object by recursively decomposing the quadtree blocks that cover it. Cost-based decomposition decisions are made by consulting a cost model furnished by the database management system to minimize the cost of the resulting index range plan on the B-tree storage. Thus, data-directed query decomposition enacted by the method results in the optimal cost index range plan for the current data distribution and system context. In another embodiment, a system identifies and displays an optimal index range plan in a user interface.

21 Claims, 26 Drawing Sheets

(56) References Cited

U.S. PATENT DOCUMENTS

| | | | |
|---|---|---|---|
| 2004/0148420 | A1 | 7/2004 | Hinshaw et al. |
| 2004/0205770 | A1 | 10/2004 | Zhang et al. |
| 2005/0021354 | A1 | 1/2005 | Brendle et al. |
| 2005/0055465 | A1 | 3/2005 | Sato |
| 2005/0055698 | A1 | 3/2005 | Sasaki et al. |
| 2005/0222978 | A1* | 10/2005 | Drory et al. ............... 707/3 |
| 2005/0268032 | A1 | 12/2005 | Sikdar et al. |
| 2006/0112398 | A1 | 5/2006 | Mukkamala et al. |
| 2006/0123010 | A1 | 6/2006 | Landry et al. |
| 2007/0073808 | A1 | 3/2007 | Berrey et al. |
| 2007/0094094 | A1* | 4/2007 | Yaron et al. ............... 705/26 |
| 2007/0099640 | A1 | 5/2007 | Khushu et al. |
| 2007/0100834 | A1 | 5/2007 | Landry et al. |
| 2007/0260475 | A1 | 11/2007 | Bhanote |
| 2007/0260628 | A1 | 11/2007 | Fuchs et al. |
| 2007/0271275 | A1 | 11/2007 | Fassette et al. |
| 2008/0104133 | A1 | 5/2008 | Chellappa et al. |
| 2008/0120304 | A1 | 5/2008 | Calio et al. |
| 2008/0155525 | A1 | 6/2008 | Ho |
| 2008/0176536 | A1 | 7/2008 | Galluzzo et al. |
| 2009/0037430 | A1 | 2/2009 | Mukkamala et al. |
| 2009/0059512 | A1 | 3/2009 | Lydon et al. |
| 2009/0063396 | A1* | 3/2009 | Gangarapu et al. ........... 707/2 |
| 2009/0171679 | A1 | 7/2009 | Salgado et al. |
| 2009/0177800 | A1 | 7/2009 | Gidron et al. |
| 2009/0187622 | A1 | 7/2009 | Xie |
| 2009/0198722 | A1 | 8/2009 | Hanson et al. |
| 2009/0222402 | A1 | 9/2009 | Tysowski |
| 2009/0247134 | A1 | 10/2009 | Jeide et al. |
| 2009/0254601 | A1 | 10/2009 | Moeller et al. |
| 2009/0307284 | A1 | 12/2009 | Welingkar et al. |
| 2010/0011075 | A1 | 1/2010 | Klassen et al. |
| 2010/0030783 | A1 | 2/2010 | Ho et al. |
| 2010/0169451 | A1 | 7/2010 | Barry |
| 2011/0154315 | A1 | 6/2011 | Singh et al. |
| 2011/0161290 | A1 | 6/2011 | Waterman et al. |
| 2011/0161339 | A1 | 6/2011 | Ireland et al. |
| 2011/0161349 | A1 | 6/2011 | Ireland et al. |
| 2011/0161383 | A1 | 6/2011 | Ho et al. |
| 2012/0158795 | A1 | 6/2012 | Ireland |
| 2012/0158828 | A1 | 6/2012 | Ireland et al. |
| 2012/0166446 | A1 | 6/2012 | Bowman et al. |

OTHER PUBLICATIONS

Aref, W. G. and Samet, H., "Efficient Window Block Retrieval in Quadtree-Based Spatial Databases," *GeoInformatica*, 1(1), pp. 59-91 (Apr. 1997).

Aref, W. G. and Samet, H., "Estimating Selectivity Factors of Spatial Operations," in A. Heuer, & M. H. Scholl (Ed.), *Foundations of Models and Languages for Data and Objects*, pp. 31-43 (Aug. 14, 1993).

Fang, Y. et al., "Spatial Indexing in Microsoft SQL Server 2008," *Proceedings of the 2008 ACM SIGMOD International Conference on Management of Data (SIGMOD '08)*, ACM, New York, NY, USA, pp. 1207-1215 (2008).

Gargantini, I., "An Effective Way to Represent Quadtrees," *Communications of the ACM*, vol. 25, No. 12, pp. 905-910 (Dec. 1982).

Kothuri, R.K.V. et al., "Quadtree and R-tree Indexes in Oracle Spatial: A Comparison using GIS Data," *Proceedings of the 2002 ACM SIGMOD International Conference on Management of Data (SIGMOD '02)*, ACM, New York, NY, USA, 546-557 (2002).

Kriegel, H.-P. et al., "Statistic Driven Acceleration of Object-Relational Space-Partitioning Index Structures," *Database Systems for Advances Applications. Lecture Notes in Computer Science 2973*, pp. 169-183. Jeju Island, Korea: Springer (2004).

Orenstein, J.A., "Redundancy in Spatial Databases," *Proceedings of the 1989 ACM SIGMOD International Conference on Management of Data (SIGMOD '89)*, ACM, New York, NY, USA, pp. 295-305 (1989).

Samet, H., *Foundations of Multidimensional and Metric Data Structures*, Morgan Kaufmann, ISBN 13: 978-0-12-369446-1, pp. 28-48, 191-193, 204-205, and 211-220 (2006).

Office Action mailed May 24, 2013, in U.S. Appl. No. 13/275,589, inventors Ireland et al., filed Oct. 18, 2011.

Linthicum, David S., "Database-Oriented Middleware and EAI," in *Enterprise Application Integration*, Chapter 11, Addison Wesley, pp. 191-208 (May 1, 2000).

Linthicum, David S., "EAI Moving Forward," in *Enterprise Application Integration*, Chapter 20, Addison Wesley, pp. 339-349 (May 1, 2000).

Sinitsyn, A., "A Synchronization Framework for Personal Mobile Servers," *Proceedings of the IEEE Annual Conference on Pervasive Computing and Communications*, pp. 1-5, Mar. 14-17, 2004.

English Language Abstract for Korean Patent Publication No. 2003/0072693 A, published Sep. 19, 2003, European Patent Office, Espacenet Database, http://worldwide.espacenet.com, 1 page (listed as document FP1on the accompanying form PTO/SB/08a).

English Language Abstract for Korean Patent Publication No. 2006/0060629 A, published Jun. 5, 2006, European Patent Office, Espacenet Database, http://worldwide.espacenet.com, 1 page (listed as document FP2on the accompanying form PTO/SB/08a).

English Language Abstract for Korean Patent Publication No. 2011/0074059 A, published Jun. 30, 2011, European Patent Office, Espacenet Database, http://worldwide.espacenet.com, 1 page (listed as document FP3on the accompanying form PTO/SB/08a).

Extended European Search Report for European Patent Application No. PCT/US2009/004343, dated Sep. 27, 2011, 6 pages.

International Search Report and Written Opinion for International Application No. PCT/US2009/004343, dated Mar. 18, 2010, 11 pages.

International Search Report and Written Opinion for International Application No. PCT/US2010/060290, dated Jul. 28, 2011, 10 pages.

International Search Report and Written Opinion for International Application No. PCT/US2010/060293, dated Aug. 2, 2011, 11 pages.

International Search Report and Written Opinion for International Application No. PCT/US2010/060296, dated Aug. 5, 2011, 9 pages.

International Search Report and Written Opinion for International Application No. PCT/US2011/065197, dated May 29, 2012, 9 pages.

Office Action mailed Apr. 25, 2012 in U.S. Appl. No. 12/503,573, Ho et al., filed Jul. 15, 2009, 14 pages.

Office Action mailed Sep. 19, 2011 in U.S. Appl. No. 12/503,573, Ho et al., filed Jul. 15, 2009, 13 pages.

Office Action mailed Jan. 3, 2012 in U.S. Appl. No. 12/760,233, Waterman et al., filed Apr. 14, 2010, 8 pages.

Office Action mailed Jul. 3, 2012 in U.S. Appl. No. 12/760,233, Waterman et al., filed Apr. 14, 2010, 9 pages.

Office Action mailed Apr. 11, 2012 in U.S. Appl. No. 12/813,104, Ireland et al., filed Jun. 10, 2010, 16 pages.

Office Action mailed Aug. 10, 2012 in U.S. Appl. No. 12/649,527, Ho et al., filed Dec. 30, 2009, 12 pages.

Office Action mailed Mar. 7, 2012 in U.S. Appl. No. 12/797,975, Ireland et al., filed Jun. 10, 2010, 8 pages.

Office Action mailed Jun. 27, 2012 in U.S. Appl. No. 12/797,975, Ireland et al., filed Jun. 10, 2010, 9 pages.

U.S. Appl. No. 13/478,181, Lorenz et al., filed May 23, 2012, entitled "Cache Conflict Detection".

U.S. Appl. No. 13/478,185, Lorenz et al., filed May 23, 2012, entitled "Composite Graph Cache Management".

* cited by examiner

INDEXING SPATIAL DATA WITH A QUADTREE INDEX HAVING COST-BASED QUERY DECOMPOSITION

BACKGROUND OF THE INVENTION

1. Field of the Invention

The present invention is directed to indexing data within database management systems (DBMSs) and, more particularly, to a spatial quadtree index with cost-based query decomposition for queries against spatial data.

2. Background of the Invention

Relational database management systems (RDBMSs) are used to store many data types. Among the data types stored in RDBMSs are spatial data types that represent points, curves, lines (linestrings), surfaces, polygons, and collections thereof (i.e., multi-surface polygons and multi-curve linestrings). In order to improve query performance, database tables, including tables storing spatial data objects, in RDBMSs are often indexed.

There are two general types of RDBMS objects: data and queries. Quadtree indexes have been used for indexing spatial data within RDBMSs. Traditional techniques for creating quadtree indexes heuristically decompose both data objects and query objects. However the traditional technique for creating quadtree indexes for spatial indexing results in decomposing geometries into multiple entries in the index, and then uses an object decomposition algorithm.

A traditional approach to indexing spatial data is object decomposition. With the object decomposition approach each table row may generate multiple index rows (each is a Morton block). With object decomposition, each spatial object can be approximated by one or more quadtree blocks using a process known as tessellation. Given spatial object o, $B_{LOCK}(o)$ can denote the smallest quadtree block that completely covers o. A decomposition of o (with respect to a quadtree index) is a collection of objects $\{o_1; \ldots, o_n, n>1\}$, that satisfy the equation $o = \cup_i o_i$ and for all distinct pairs $(o_i; o_j)$, $B_{LOCK}(o_i)$ and $B_{LOCK}(o_j)$ are disjoint. Traditional object decomposition can be applied in two distinct contexts: to data objects, and to query objects. Traditional algorithms for object decomposition choose a decomposition heuristically based only upon the geometry of the object itself (e.g. minimize the area of $\cup_i B_{LOCK}(o_i)$). Accordingly, with traditional approaches to indexing spatial data using object decomposition, no distinction is made between data and query objects when performing the decomposition.

In existing RDBMSs, spatial indexes are created through object decomposition. However, each row of spatial data tables may generate multiple index rows, wherein each index row is a Morton block. This can result in up to O(2N) blocks for objects with N levels and 2N bits. With this conventional technique, each object is decomposed independently. This is can be inefficient because objects are decomposed before the DBMS knows the data distribution of the objects. When objects are decomposed independently tuning parameters specified by the user guide the depth of tiling for the objects. Conventional object decomposition also typically stores flags with the index entries. These flags may indicate properties such as whether an index entry touches, partly covers, or is within (i.e., in the interior) of an object. Although these flags can support a secondary filter, storing and maintaining the flags with the index entries creates additional overhead for an RDBMS and results in large index sizes.

Accordingly, what is desired are systems, methods, and computer program products which create a spatial quadtree index with cost-based query decomposition in database management systems. What is further desired are systems, methods, and computer program products to efficiently create spatial quadtree indexes without decomposing objects and instead only decompose queries so as to avoid having to optimize each time a query is executed.

BRIEF SUMMARY

The capability to generate spatial quadtree indexes without decomposing spatial data objects is provided. Embodiments of the present invention are directed to systems, methods and computer program products for indexing spatial data in a database management system (DBMS). The indexing discussed herein improves the efficiency of queries for spatial data.

Briefly stated, the invention performs data-directed cost-based partitioning of spatial query objects. In embodiments, the spatial data can be geometric data such as, but not limited to points, lines (i.e., linestrings), polygons, and complex collections of points, lines, and polygons. A spatial quadtree index is disclosed that can be used with both two dimensional (2D) planar data and three dimensional (3D) data.

Embodiments of the invention create a spatial index by inserting data objects into a logical quadtree. In one embodiment, such spatial index creation is accomplished by inserting Morton keys into a binary tree (B-tree) index. This step is only performed when the database is updated, which could be once in bulk load scenarios, or incrementally for separate insertions/deletions.

According to an embodiment, during spatial index creation, the spatial objects are not decomposed. Instead, the methods and systems described herein find the smallest containing Morton block, and insert that single key into the index. Improved techniques for spatial index creation described herein do not tessellate spatial data objects so as to allow improved performance for index creation.

Embodiments of the invention relate to querying a spatial index, that is, retrieval of data objects from an existing spatial index. Such querying does not create or modify the spatial index. The improved querying techniques described herein are carried out by completing three distinct steps:

1) Tessellating/decomposing the query object o into some decomposition $O = \{o1, \ldots, on\}$
2) Translating decomposition O into a set of index key ranges, which forms index range plan P
3) Using plan P to retrieve data objects from the spatial index.

In one embodiment, a query for spatial data (i.e., a query object) and a spatial data object (i.e., a data object) are received. The query is parsed and decomposed using a query decomposition algorithm that computes the costs of index range plans for queries using given indexes. The costs of the index range plans for unique queries against an index are normalized. In an embodiment, a database management system (DBMS) provides a mechanism, such as an execution unit, for computing the estimated cost of executing a given plan. The query decomposition algorithm decomposes intersection, containment, and within queries that are to be performed on an index of data objects.

The choice of query decomposition can greatly affect query performance, but the choice is difficult to make heuristically: while overly coarse-grained decompositions may incur high scanning costs, overly fine-grained decompositions can be equally expensive due to a large number of separate index probes. In another embodiment, in order to minimize execution cost, a DBMS chooses the decomposition of a query object that yields the optimal index range plan, where optimality is defined relative to an abstract plan-costing function provided by the DBMS. According to this embodiment, a second algorithm is employed to perform this task. The second algorithm can be applied to queries over any linearized quadtree index, independent of the chosen linearization or whether or not data objects are decomposed. The final plan output by the second algorithm corresponds to a particular query decomposition, but this chosen decomposition is identified by the plan-costing function. This is because the cost function can encapsulate knowledge specific to the data objects (e.g., number of data objects, statistical distribution of key values) as well as the current system context (e.g., system load, how much of the index is in memory, etc.). In this way, the second algorithm automatically adapts to changes in the underlying data or system context (to the degree that these changes are reflected in a cost model of the DBMS).

In another embodiment of the invention, a third algorithm is used to perform an efficient, detailed implementation of the second algorithm discussed above. According to this embodiment, the third algorithm is specific to the case of a quadtree index based upon a Morton key encoding, which contains non-decomposed data objects. This embodiment includes the following enhancements: enumeration of all possible object decompositions is performed by a single recursive depth-first traversal of the (logical) quadtree; the index range plan is efficiently assembled incrementally at each step of a recursive traversal wherein knowledge of the Morton key ordering is used to merge adjacent key ranges whenever possible; and branch-and-bound pruning is used to prune the search space while retaining optimality of the search. With regards to the branch-and-bound pruning, monotonicity of the cost model guarantees that plan costs increase as the traversal proceeds down the quadtree, and so at each step in the recursion it is safe to backtrack whenever the cost of the current (partially constructed) plan exceeds the cost of a plan that spanned an entire ancestor block. In one embodiment, an upper bound can be used to determine if backtracking needs to be done.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
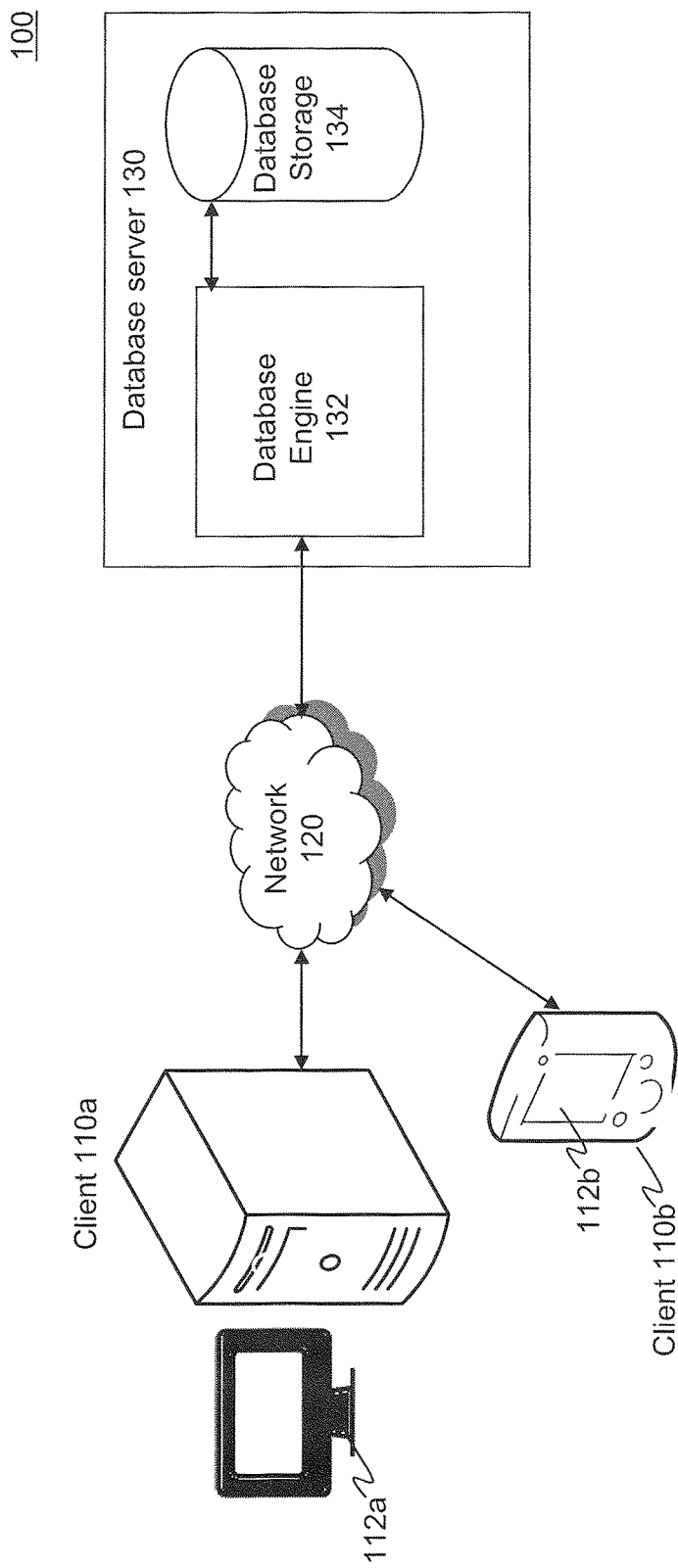
FIG. 1 is a diagram of an exemplary database system in which embodiments may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

Table of Contents
I. Database System
II. Database Server Implementation
III. Spatial Quadtree Index Creation
  A. Linear Quadtree Index Creation with Morton blocks
  B. Object Decomposition and Tessellation
IV. Query Decomposition
V. Performance Results
VI. Example User Interface for Index Creation
VII. Methods
VIII Example Computer System Implementation
IX. Conclusion Embodiments relate to database query optimization for spatial data using an efficient method for creating spatial quadtree indexes. While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "database" and "database storage" may be used interchangeably herein to refer broadly and inclusively to any organized digital collection of data that one or more client devices in a database system can use to store and/or retrieve such data. Such a database can include, but is not limited to, a relational database comprising data stored as a series of tables and views, also referred to as relations, where each table and view comprise one or more rows or records. As used herein, in an embodiment, the term "spatial data" refers to geometric two dimensional (2D) planar and three dimensional (3D) data, such as, but not limited to, points, curves, lines (linestrings), surfaces, polygons, and collections thereof (i.e., multi-surface polygons and multi-curve linestrings). As used herein, the terms "spatial index", "linear quadtree index", and "quadtree spatial index" refer to indexes used to facilitate accessing spatial data stored in database table(s), in accordance with an embodiment of the invention. A spatial index is used to restrict, a priori, the number of rows that need to be considered for a spatial predicate. A spatial predicate can be for example, a query to show all street addresses within a geometry object, such as a polygon representing a state or other region. In this example, if a query is looking for all house addresses within the state of Texas, a spatial index can be used to quickly filter out addresses in other countries. In this way a spatial index can quickly reduce the number of candidates that need to be evaluated for a result set.

As would be understood by those skilled in the relevant art(s), the term "sargable predicate" indicates a predicate that can be evaluated efficiently at run time by scanning an index to avoid a full table scan to determine candidates for the predicate.

Unless specifically stated differently, a user is interchangeably used herein to identify a human user, a software agent, or a group of users and/or software agents. Besides a human user who needs to create and use spatial indexes, a software application or agent sometimes needs to create and use spatial indexes. Accordingly, unless specifically stated, the term "user" as used herein does not necessarily pertain to a human being.

I.—Database System

The present invention is directed to systems, methods and computer program products for spatial quadtree indexing in a database management system (DBMS).

FIG. 1 is a diagram of an exemplary database system 100 in which embodiments may be implemented. Database system 100 includes a client 110, a network 120, and a database server 130. Database server 130 includes a database engine 132 and database storage 134.

Database system 100 includes one or more clients 110 in communication with a database server 130 via a network 120. In the example embodiment of database system 100, client 110a is a desktop computer having a display device 112a and mobile client 110b is a mobile device having display device 112b. Database management system (DBMS) 140 resides in database server 130. It is noted that the example client/server database system 100 is shown in FIG. 1 and discussed herein solely for purposes of illustration, and not limitation. The invention is not limited to the example of FIG. 1.

Client 110 is operable to send requests for data, commonly in the form of database queries, to database server 130 over network 120. Database server 130 replies to each request by sending a set of results, commonly in the form of result rows from a database table, to client 110 over network 120. One skilled in the relevant art given this description will appreciate that any data format operable to convey a request for data and a reply to the request may be used. In accordance with an embodiment, the requests and replies are consistent with the conventions used in the Structured Query Language ("SQL"), although this example is provided solely for purposes of illustration and not limitation.

Clients 110a and 110b can be any type of computing device having one or more processors, a user input (for example, a mouse, QWERTY keyboard, touch-screen, microphone, or a T9 keyboard), and a communications infrastructure capable of receiving and transmitting data over a network. For example, client 110a can include, but is not limited to, a desktop computer, a cluster of desktop computers, a server, a cluster of servers, a set-top box, or other similar type of device capable of processing instructions and receiving and transmitting data to and from humans and other computing devices.

Also for example, client 110b can include, but is not limited to, a mobile phone, a personal digital assistant (PDA), can include, but is not limited to, a personal digital assistant ("PDA"), an iPhone™, an iPod™, iTouch™ or iPad™ touch device, a device operating the Android operating system (OS) from Google Inc., a device operating according to the Microsoft Pocket PC specification with the Microsoft Windows® CE OS, a device running the Microsoft Windows® Mobile Standard OS, a device running the Microsoft Windows® Mobile Professional OS, a device running the Symbian OS, a device running the Palm OS®, a mobile phone, a BlackBerry® device, a smart phone, a hand held computer, a netbook computer, a palmtop computer, a laptop computer, an ultra-mobile PC, or another similar type of mobile device capable of processing instructions and receiving and transmitting data to and from humans and other computing devices.

Similarly, database server 130 may be implemented on any type of computing device. Such a computing device can include, but is not limited to, a device having a processor and memory for executing and storing instructions. Software may include one or more applications and an operating system. Hardware can include, but is not limited to, a processor, memory, a user input, a graphical user interface display, and a communications infrastructure capable of receiving and transmitting data over a network. The computing device may also have multiple processors and multiple shared or separate memory components. For example, the computing device may be a clustered computing environment or server farm.

Network 120 can be any network or combination of networks that can carry data communication. Such network can include, but is not limited to, a wired (e.g., Ethernet) or a wireless (e.g., Wi-Fi and 3G) network. In addition, network 120 can include, but is not limited to, a local area network, medium area network, and/or wide area network such as the Internet. Network 120 can support protocols and technology including, but not limited to, Internet or World Wide Web protocols and/or services. Intermediate network routers, gateways, or servers may be provided between components of database system 100 depending upon a particular application or environment.

When a request for data, such as a query, is received by database server 130, it is handled by database engine 132, in accordance with an embodiment of the present invention. Database engine 132 is operable to determine the data requested by the query, obtain the data, and provide a reply to the query. One skilled in the relevant art given this description will appreciate that while database engine 132 is illustrated as a single module in database system 100, database engine 132 may be implemented in a number of ways in order to accomplish the same function, including separating each of the aforementioned operations performed by database engine 132 into individual modules. Accordingly, the illustration of modules in database server 130 is not a limitation on the implementation of database server 130. For example, additional modules not shown in FIGS. 1 and 2 can be employed to implement algorithms 1, 2, and 3 presented in tables 1, 5, and 6, respectively, below.

Database engine 132 is operable to obtain the data in response to the query from database storage 134, in accordance with an embodiment of the present invention. Database storage 134 stores values of a database in a data structure. In accordance with an embodiment of the present invention, database values are stored in a table data structure, the table having data rows and columns. At the intersection of each row and column is a data cell, the data cell having access to a data value corresponding to the associated row and column. Each column, in accordance with an embodiment of the present invention, has an associated data type, such as "string" or "integer," which is used by database engine 132 and client 110 to interpret data contained in a data cell corresponding to the column. In accordance with an embodiment of the present invention, the database comprises multiple tables.

Additionally, database storage 134 comprises alternate means of indexing data stored in a table of a database, in accordance with an embodiment of the present invention. Database engine 132 is operable to analyze a query to determine whether an available alternate means is useful to optimally access the data stored in a table, and then utilizes this alternate means to obtain data from the table, in accordance with an embodiment of the present invention.

Further, database storage 134 may be implemented as a relational database and database engine 132 may be implemented using a database management system (DBMS) or relational database management system (RDBMS), in accordance with an embodiment of the present invention. An example of such an RDBMS is, for example and without limitation, SYBASE™ SQL Anywhere™ from Sybase, Inc. of Dublin, Calif. A person skilled in the relevant art given this description would appreciate that embodiments may be operable to work with any DBMS or RDBMS.

For example, database storage 134 may be a relational database in which data is stored as a series of tables, also called relations. Typically resident on the database server 130, each table itself comprises one or more "rows" or "records" (tuples). A typical relational database will contain many tables, each of which stores information about a particular type of entity. Additional details regarding the characteristics of tables and relational databases in general would be apparent to a person skilled in the relevant art given this description.

II.—Database Server Implementation

Figure 2:
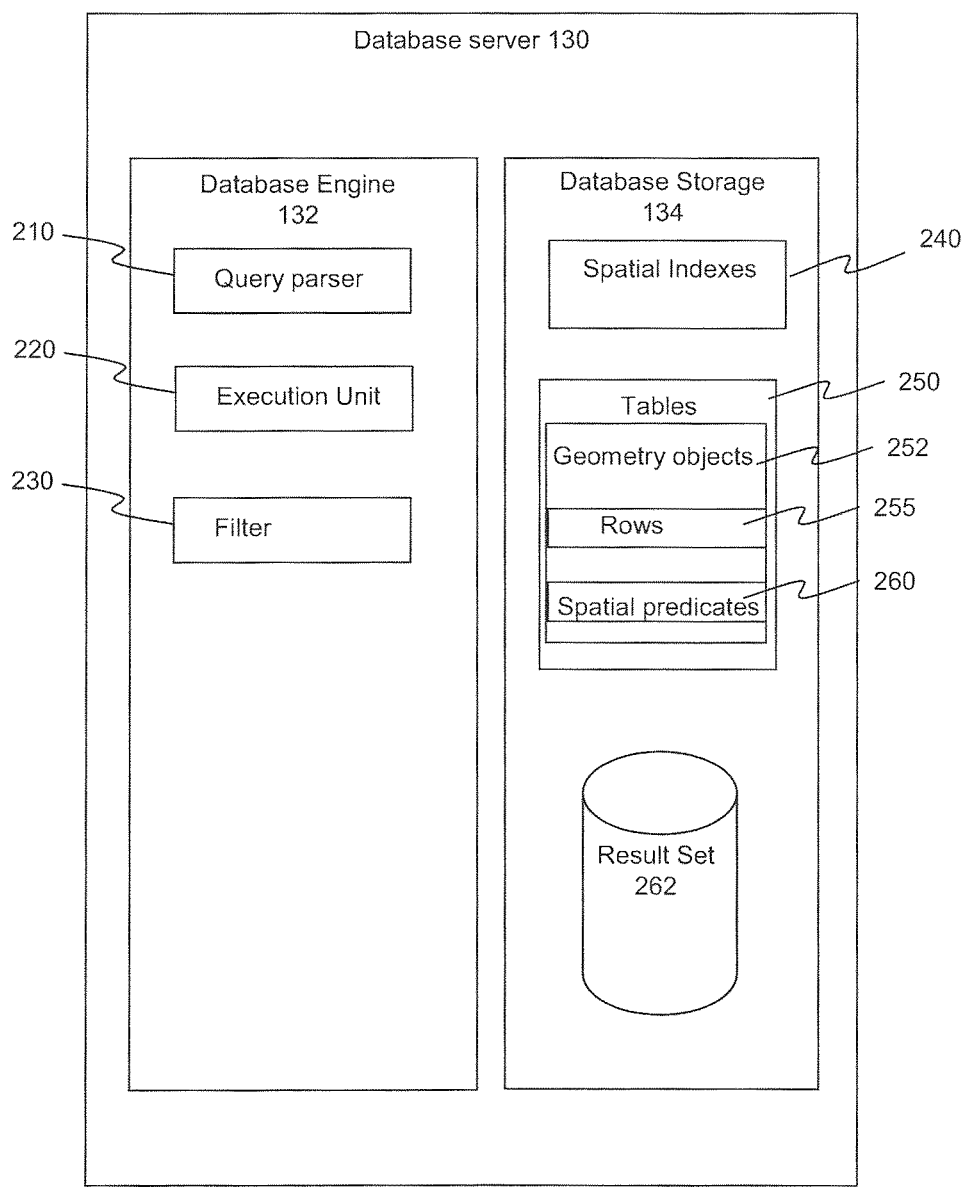
FIG. 2 illustrates an exemplary database server in which embodiments may be implemented.

FIG. 2 illustrates an exemplary database server 130 in which embodiments may be implemented, according to an embodiment. As noted above with respect to FIG. 1 and in the example shown in FIG. 2, database server 130 comprises database engine 132 and database storage 134. In an embodiment, database engine 132 comprises a query parser 210, an execution unit 220, and a filter 230. In an embodiment, database storage 134 comprises spatial indexes 240 and one or more database tables 250. Spatial indexes 240 may be used to facilitate accessing data stored in database table(s) 250, in accordance with an embodiment. Tables 250 are used to store geometric data for geometry objects 252. Spatial indexes 240 are used to restrict, a priori, the number of rows 255 that need to be considered for a spatial predicate 260. In this way a spatial index 240 can quickly reduce the number of candidates that need to be evaluated for inclusion in a result set 262.

The following code is an embodiment of creating values for a geometry object 252. In this example embodiment, SQL is used to create a variable and a database table 250 for a geometry object 252 having data fields with ST_Point and ST_Geometry data types. The subsequent SQL WHERE clause tests a spatial predicate 260 between the variable and the geometry object stored in the table. As would be appreciated by one of skill in the relevant arts, other programming languages and technologies can be used to create the geometry object 252 or express the spatial predicate 260 listed in the programming language code sample below.

```
CREATE VARIABLE @pt ST_Point
CREATE TABLE Store(
    pk          int,
    manager     char(16),
    name        char(16),
    address     ST_Point,
    catchment   ST_Geometry )
WHERE manager = 'Ivan'
    and catchment.ST_Contains( @pt )
```

Geometric data representing one or more of points, curves, lines (linestrings), surfaces, polygons, and collections thereof (i.e., multi-surface polygons and multi-curve linestrings) can be stored as geometry objects 252.

Figure 3:
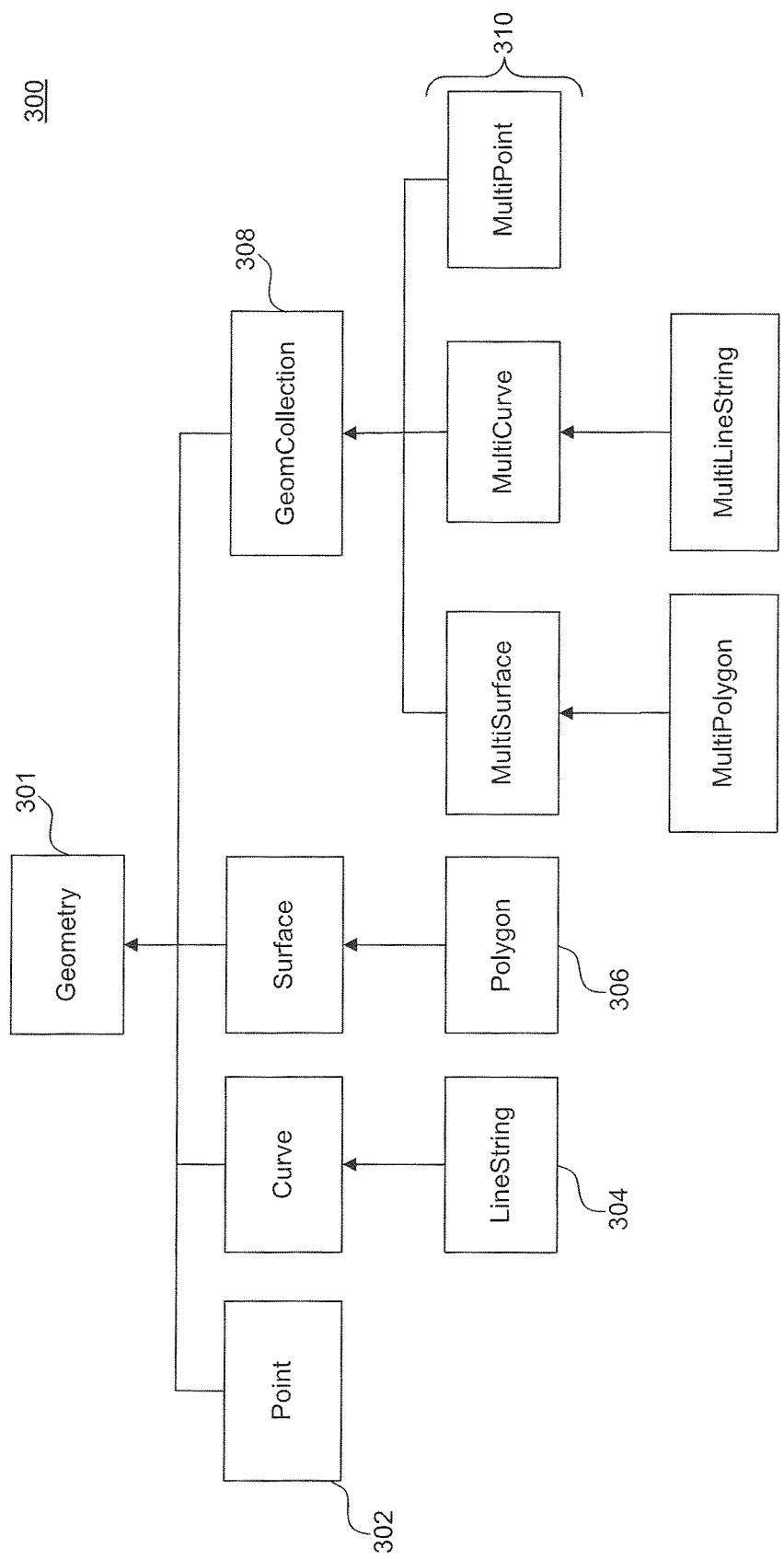
FIG. 3 is a diagram depicting spatial data types.

FIG. 3 illustrates a hierarchy 300 of spatial data types for geometry objects 252. As shown in FIG. 3, a geometry value within geometry 301 can be a point 302, linestring 304, or polygon 306. In addition, a geometry value can be a collection of geometry values, for example a multi-polygon 310, multi-linestring 310, or multi-point 310. Further, abstract types can be used to declare a value that can hold any value with a sub-type. For example, a value declared to be of type GeomCollection 308 can have a value stored with type MultiPolygon, MultiLineString, MultiSurface, MultiCurve, or Multi-Point 310. The base type, geometry 301, can be used to declare a variable or column that can hold a value of any spatial type. FIG. 3 does not depict all spatial data types supported by embodiments of the invention. For example, in embodiments of the invention, spatial quadtree indexing is supported for additional spatial data types not shown in FIG. 3, such as, but not limited to, CircularStrings: Curves, CompoundCurve: Curve, and CurvePolygon: Surface.

In an embodiment, spatial indexes 240 are linear quadtree indexes used to more efficiently execute queries against geometry objects 250. As shown in FIG. 2, each table within database table(s) 250 comprises one or more rows 255 and one or more spatial columns 260. Due to the nature of spatial data, each row 255 may store a large amount of data. According to an embodiment, geometry objects 252 are tessellated into indexed rows 255. Spatial predicates 260 are predicates on spatial data stored in rows 255. For example, spatial predicates can include, but are not limited to, equals/disjoint; within/contains, intersects/touches/overlaps/crosses/relate, and distance to object. There may be scalar predicates on distance object predicates.

It is noted that the example database server 130 as shown in FIGS. 1 and 2 and discussed herein solely for purposes of illustration and no limitation. Embodiments are not limited to the examples of FIGS. 1 and/or 2.

In an embodiment, clients 110a and 110b of FIG. 1 can store data in, or retrieve data from rows 255 of database tables 250 by issuing statements to database server 130. Such statements may include, for example and without limitation, structured query language (SQL) statements. In operation, for example, client 110a may issue one or more SQL commands to database server 130. SQL commands may specify, for instance, a query for retrieving particular spatial data (i.e., data records meeting the query condition) from database tables 250. In particular, SQL queries for spatial data can include, but are not limited to a "stabbing" or point query, a query for all objects that overlap with a point, an area or window query, a query for objects completely contained in a window, a query for objects that overlap window in any way, a distance query as a variant of a window query, a query to find a neighbor of an object (not necessarily the nearest neighbor). For example, a query to find the nearest k neighbors can be implemented using a query to find a neighbor in conjunction with subsequent window queries. In addition to retrieving spatial data from database tables 250, clients 110 also have the ability to issue commands to insert new rows of data records into database tables 250, or to update and/or delete existing records in database tables 250.

As noted above, database server 130 may include a DBMS (or RDBMS) to facilitate data access, retrieval, storage, and other database operations between client 110 and database tables 250. Also as noted above, database engine 132, including its components (query parser 210, execution unit 220, and filter 230), or portions thereof, may be implemented in such DBMS, according to an embodiment. In addition, such DBMS can have a certain amount of memory at database server 130 available for its use. For example, all data in a typical relational database system (RDBMS) is stored in pages on a secondary storage device, usually a hard disk. Typically, these pages may range in size from 1 KB (kilobyte) to 32 KB, with the most common page sizes being 2 KB and 4 KB. It is noted that the above page sizes are included for illustrative purposes only. It would be apparent to a person skilled in the relevant art given this description that other page sizes may be used as necessary. All input/output operations (I/O) against secondary storage are done in page-sized units. i.e., the entire page is read/written at once. The memory in which pages that have been read from disk reside is called the cache or buffer pool.

In an embodiment, client 110 is configured to enable a user (not shown) to search database storage 134 for spatial information stored therein. For example, the user may use a user input device (i.e., a keyboard, a touch screen, a pointing device, a mouse, or another input device) at client 110a to enter and submit queries from client 110a to database server 130. Further, such queries may be sent from mobile client 110b as statements to database server 130, as described above. Additionally, such queries may be in the form of one or more search phrases. Each search phrase can contain one or more search terms. For example, each search phrase may be separated by a search operator including, but not limited to, an "AND" operator and the "OR" operator, which can also be represented using the T (vertical bar) operator.

In an embodiment, there are three fundamental queries that can be performed on a spatial index 240 of data objects. These three queries are: an intersection query $Q_{INTERSECTS}(o)$, which returns index entries of objects that query object o might interact with in any way; a containment query $Q_{CONTAINS}(o)$, which returns index entries of objects that query object o might contain; and a within query $Q_{WITHIN}(o)$, which returns index entries of objects that query object o might lie within. In cases where the data objects are all points, intersection and containment queries correspond. Similarly, in cases where a query object is a point, intersection and within queries correspond and are called stabbing queries.

As will be described in further detail below with reference to FIG. 4, filter 230 is operable in conjunction with spatial indexes 240 to limit the rows that database server 130 needs to consider, in order to reduce input/output (I/O) based on the number of search terms in a single query or search phrase or in multiple queries or search phrases.

In an embodiment, query parser 210 receives one or more search phrases from client 110a or mobile client 110b. Query parser 210 may convert each received search phrase into a data representation format internally used by database engine 132. For example, if the search phrases comprise SQL statements, these statements may be converted by query parser 210 into a parse tree. A parse tree is a data structure that represents the components of the query in a format selected for the convenience of the system. In this regard, query parser 210 employs well known parsing methodology (e.g., recursive descent parsing). A person skilled in the relevant art given this description would appreciate that query parser 210 may perform additional operations on the received search phrases as may be necessary to retrieve spatial data from tables 250.

Query parser 210 passes the received search phrases, i.e., subsequent to any conversion or reformatting, as noted above, to execution unit 220, in accordance with an embodiment. Execution unit 220 is configured to execute a database query based on the search phrases. In response to the execution of the database query, one or more data records are returned as search results from database storage 134. For example, the search results may comprise data associated with one or more rows from rows 255 associated with one or more tables in database tables 250. Each search result from database storage 134 may comprise one or more of the search terms that match the search phrase. In an embodiment, the result set for a query parsed by query parser 210 and executed by execution unit 220 is stored in result set 262 within database storage 134. However, it is noted that the database query executed by execution unit 220 may not return any search results if there are no terms within tables 250 that match the search terms.

III.—Spatial Quadtree Index Creation

Figure 4:
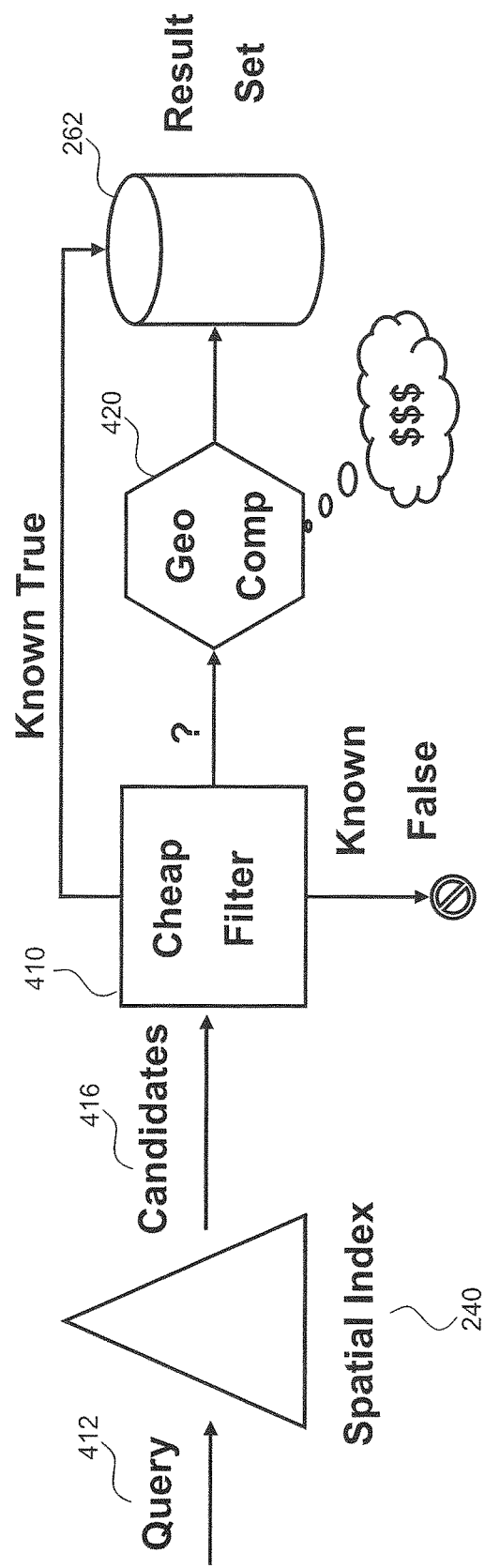
FIG. 4 is a flowchart illustrating a method of using a spatial index, according to an embodiment of the invention.

FIG. 4 illustrates a high level flow chart depicting how a spatial index is used, in accordance with an embodiment of the invention. FIG. 4 is described with continued reference to the embodiments illustrated in FIGS. 1-3. However, FIG. 4 is not limited to those embodiments.

In accordance with an embodiment of the present invention shown in FIG. 4, the process for using a spatial index begins when a query 412 is received. After spatial index 240 is applied to the query, candidates 416 are output. As discussed above, spatial index 240 is used to reduce the number of candidates 416 a priori before cheap filter 410 is applied. Spatial index 240 limits the number of candidates 416 that cheap filter 410 needs to consider.

Cheap filter 410 may be filter 230 described above with reference to FIG. 2. Cheap filter performs non-exhaustive (i.e., cheap in terms of processing resources consumed) filtering to determine if candidates 416 should be stored as part of result set 262. Cheap filter 410 reduces the cost of spatial predicates 260. However, the application of filters 230 such as cheap filter 410 can result in the use of extra rows in a spatial index 240 or data rows 255 in a database table 250. Cheap filter 410 determines whether or not a given candidate 416 satisfies query 412 (i.e., true) or does not (i.e., false). As shown in FIG. 4, if cheap filter 410 determines that one or more candidates are known to be false, or outside the parameters of query 412, they are excluded from result set 262. On the other hand, if cheap filter 410 determines that one or more candidate 416 are known to meet the criteria of query 412, they are stored in result set 262 without further processing. Alternatively, if cheap filter 410 cannot readily determine whether or not a given candidate 416 satisfies query 412 or does not, the candidates are evaluated with more precise spatial tests by geometric component 420. As illustrated in FIG. 4, the precise spatial tests performed by geometric component 420 are more resource intensive (i.e., expensive) than the filtering performed by cheap filter 410.

A. Linear Quadtree Index Creation with Morton Blocks

Figure 5:
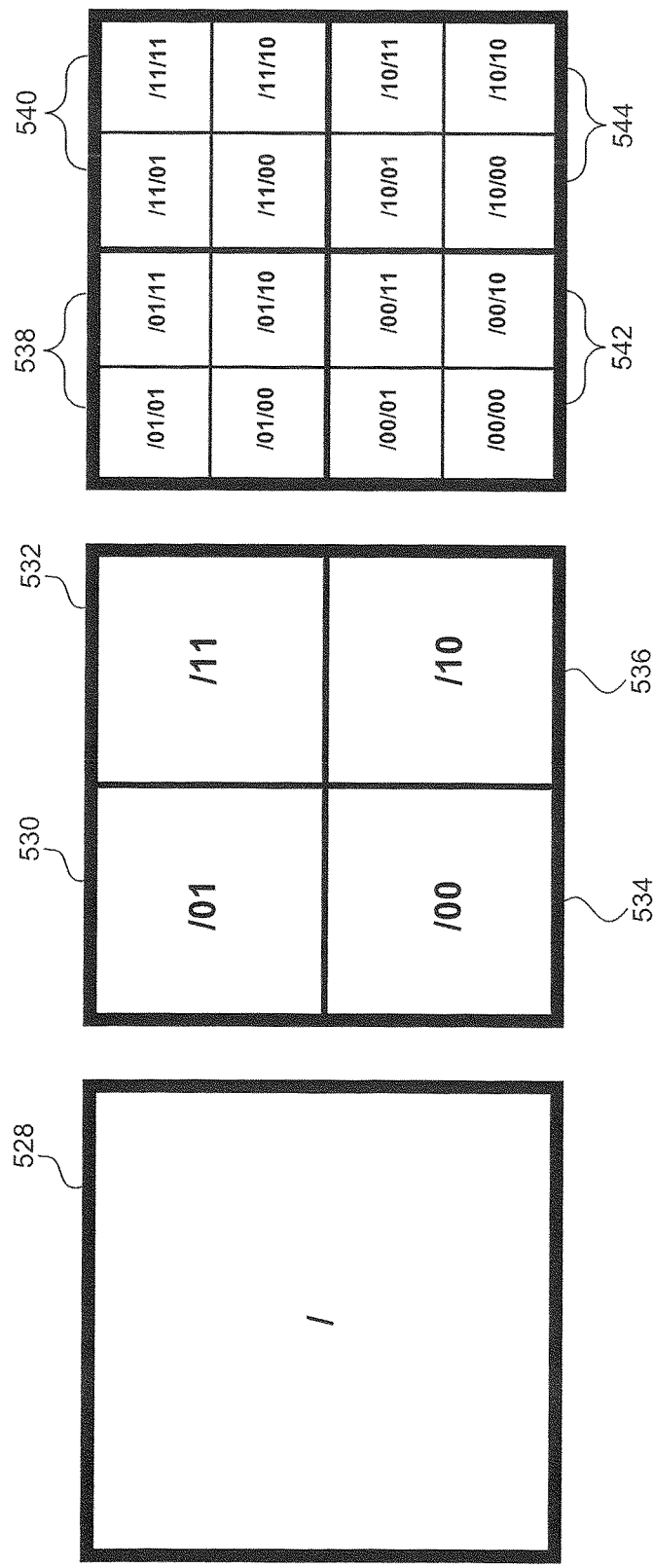
FIG. 5 depicts creation of a spatial quadtree index by recursive subdivision of a space in a Morton order and Morton blocks.
Figure 6:
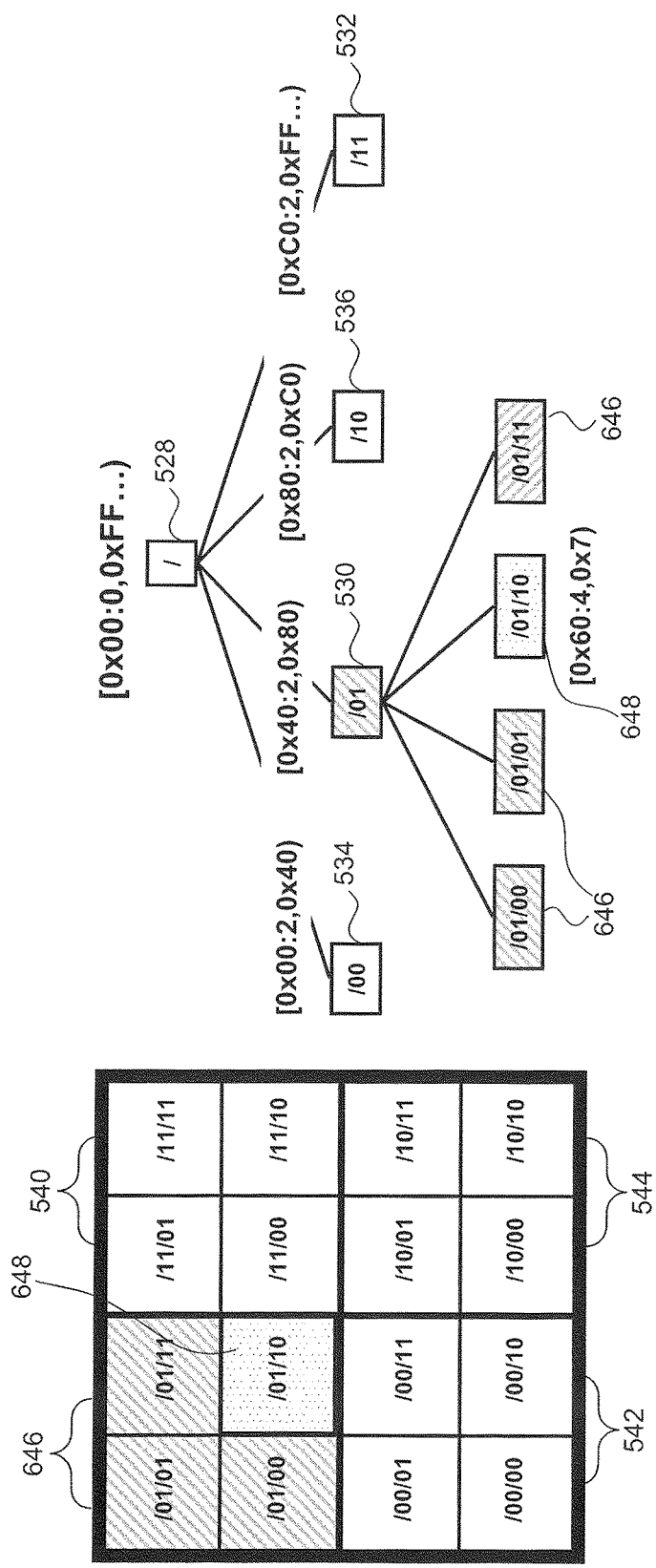
FIG. 6 illustrates a representation of Morton blocks.

According to an embodiment, the invention recursively partitions quadtree blocks as shown in FIGS. 5 and 6 (although this embodiment is mentioned solely for illustrative purposes, and is not limiting). According to an embodiment, this partitioning is implemented using the algorithm provided in Table 1. In an embodiment of the invention, the algorithms described herein may be implemented in an RDBMS such as, but not limited to, SYBASE™ SQL ANYWHERE™ 12.0.

TABLE 1

Algorithm 1 for Recursive Partitioning of Quadtree Blocks

```
PARTITION(b) returns (b₀, b₁)
    ▷ Input: block b
    ▷ Output: child blocks b₀, b₁ satisfying b = b₀ ∪ b₁
        and DEPTH(b₀) = DEPTH(b₁) = DEPTH(b) + 1
1   if DEPTH(b) is even
2       then    b₀ ← left half of b
3               b₁ ← right half of b
4       else    b₀ ← bottom half of b
5               b₁ ← top half of b
6   return (b₀, b₁)
```

For the purposes of algorithm 1 shown in Table 1, the recursive partitioning process is split into two steps. Table 1 illustrates an equivalent recursive partitioning of blocks which derives the Morton key one bit at a time. In an embodiment, using this partitioning scheme, the depth of block b denoted as DEPTH(b) is defined as the number of bits in its Morton key.

FIG. 5 depicts an exemplary process for recursive subdivision of a space in a Morton order and Morton blocks as part of creation of a linear quadtree index. In particular, FIG. 5 illustrates a linear quadtree index with the choice of a Morton space-filling curve.

As shown in FIG. 5, in an embodiment, a space 528 is recursively subdivided into four even blocks. For example, space 528 is evenly divided into four blocks, blocks 530, 532, 534, and 536. This four-way or quad division is repeated for blocks 530, 532, 534, and 536. In the example illustrated in FIG. 5, the upper left block 530 of space 528 is subdivided into sub-blocks 538, upper right block 532 is subdivided into sub-blocks 540, lower left block 534 is subdivided into sub-blocks 542, and lower right block 536 is subdivided into sub-blocks 544.

In an embodiment, variable length keys are used to identify blocks of different sizes. For example a shorter key can be used to identify space 528, with incrementally larger keys used to identify child block 530 and its sub-blocks 538. In the example shown in FIG. 5, space 528 is subdivided evenly into four blocks in Morton order. Child blocks 530, 532, 534, 536 and their respective sets of sub-blocks 538, 540, 542, and 544 are called Morton blocks. However, as would be understood by those skilled in the relevant art(s), another ordering, such as Hilbert-Peano space filling curves, could be used.

As shown in FIG. 5, a key prefix is equivalent to spatial hierarchy. For example, the /01 key for block 530 contains all corresponding sub-blocks 538 (e.g., Morton keys /01/01, /01/11, 01/00, and 01/10). This containment can be expressed as linear ranges.

FIG. 6 provides a representation of Morton blocks with Morton ordering and Morton keys, in accordance with an embodiment of the invention. FIG. 6 is described with continued reference to the embodiment illustrated in FIG. 5. However, FIG. 6 is not limited to that embodiment.

As shown in FIG. 6, each block is directly sub-divided into four quadrants. For example, block 530 depicted in FIG. 5 is sub-divided into four child blocks, including three sub-blocks 646 and sub-block 648. As shown in FIG. 6, the Morton key of each child block is then faulted from the parent block's key by appending two bits to distinguish the child. For example, the Morton key of /01/10 for block 648 using the /01 key prefix of parent block 530. As shown in FIG. 5, each block is directly sub-divided into four quadrants. For example, block 528 is sub-divided into four child blocks, including blocks 530, 532, 534, and 536. As shown in FIG. 5, the Morton key of each child block is then formed from the parent block's key by appending two bits to distinguish the child. For example, the Morton key of /01/10 for the lower right-most child block 538 is formed using the /01 key prefix of parent block 530.

In the example embodiment depicted in FIG. 6, a quadtree is constructed as space 528 is recursively subdivided into four even Morton blocks. For example, space 528 is a parent node of the quadtree of FIG. 6 with child blocks 534, 530, 536 and 532 being peer leaf nodes. In turn, sub-blocks 646 and sub-block 648 are peer leaf nodes of their parent node of sub-block 530. In the exemplary embodiment of FIG. 6, hexadecimal addresses are assigned to the quadtree's nodes and leaves as the recursive partitioning of quadtree blocks is performed. In FIG. 6, blocks are shaded differently depending on whether they are completely covered by an object (diagonal stripes), partially covered (dots), or do not touch the object at all (unshaded).

B. Object Decomposition and Tessellation

Figure 7:
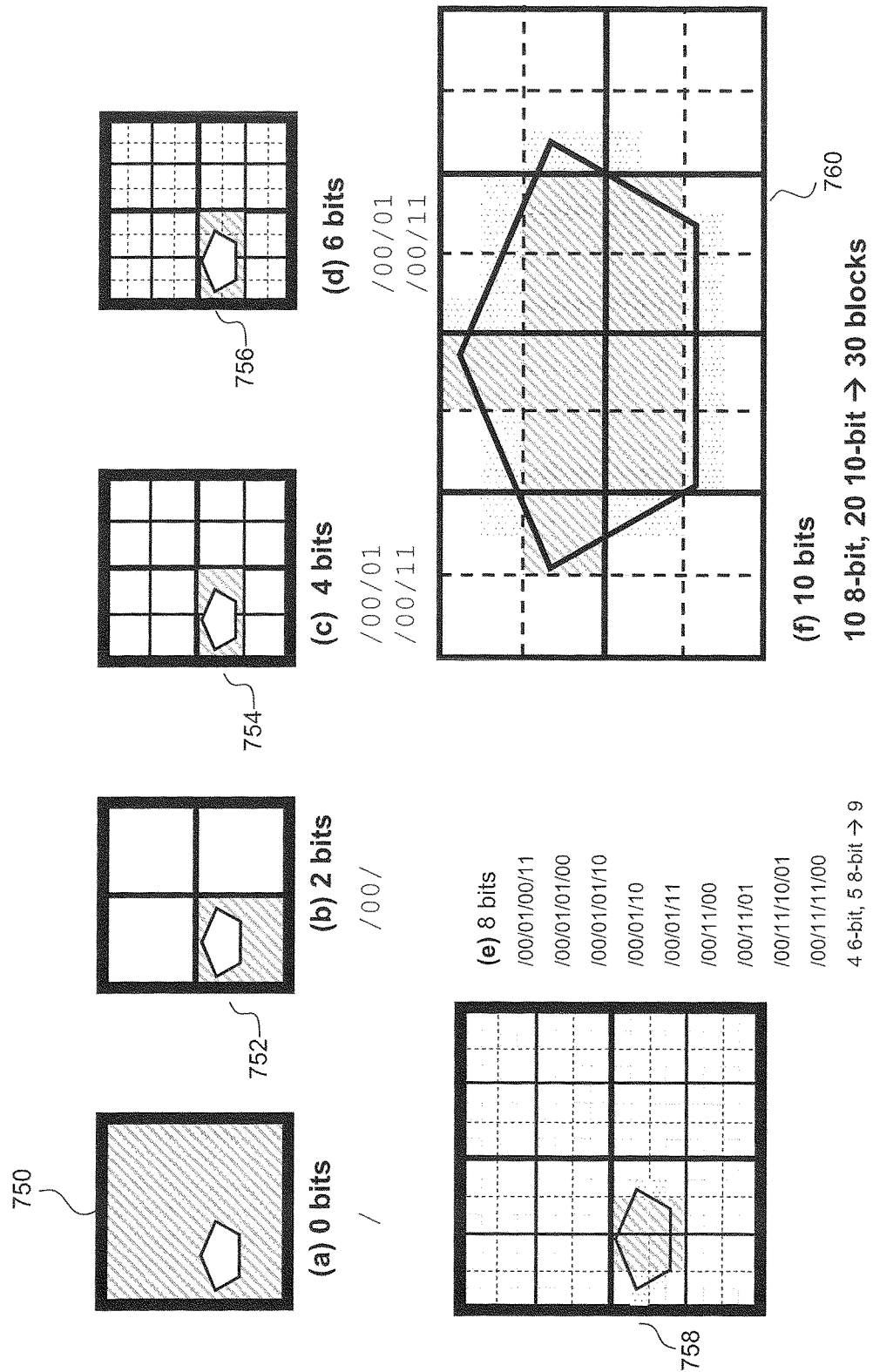
FIG. 7 illustrates tessellation with Morton blocks.

FIG. 7 depicts an exemplary tessellation, or tiling, of a geometry object with Morton blocks. In particular, FIG. 7 illustrates tessellation of an object into blocks 750, 752, 754, 756, 758, and 760. FIG. 7 is described with continued reference to the embodiment illustrated in FIG. 2. However, FIG. 7 is not limited to that embodiment.

In an embodiment, tessellations must completely cover the object with Morton blocks. As shown in FIG. 7, space 750 is the entire 'world' or space and necessarily contains a geometry object (e.g., the pentagon depicted in FIG. 7) that a query is searching for. This geometry object is to be recursively tessellated into smaller Morton blocks. The geometry object may be a geometry object 252 discussed above with reference to FIG. 2.

Space 750 is recursively sub-divided into four Morton blocks, including child block 752, which is one quarter of world 750 and completely contains the geometry object (e.g., the pentagon depicted in FIG. 7). Block 752 has a 2 bit Morton key, /00/. Block 752 is then sub-divided into four sub-blocks, including two sub-blocks 754, which each contain a portion of the geometry object. Sub-blocks 754 have 4 bit Morton keys (e.g., /00/01 and /00/11). Sub-blocks 754 are then sub-divided further into blocks 756 each containing a portion of the geometry object and having 6 bit Morton keys. These Morton blocks 756 are in turn subdivided evenly into four sub-blocks 758, which all contain a portion of the geometry object and having 8 bit Morton keys (e.g., /00/01/00/11, /00/01/01/00, /00/01/01/10, /00/11/10/01, and /00/11/11/00). Blocks 756 are sub-divided into sub-blocks 760 having 10-bit Morton keys. As shown in FIG. 7, some of blocks 758 and 760 are fully contained within the geometry object being tessellated, some are partially within the geometry object, and others are completely outside the geometry object (i.e., Morton blocks either touch, partly cover, or are in the interior of a geometry object 252 being tessellated).

With continued reference to the Morton ordering and Morton keys discussed above with reference to FIGS. 5-7, in a linearized quadtree, the chosen linearization (i.e., space-filling curve) assigns each quadtree block b to a unique index key $K_{EY}(b)$. In an embodiment, given a block b, we use $\mathcal{P}$=(b), $\mathcal{P}_{anc}(b)$, and $\mathcal{P}_{desc}(b)$ to denote the following queries listed in Table 2 below.

TABLE 2

Quadtree Block Retrieval Queries

| Query no. | Query |
|---|---|
| 1 | $\mathcal{P}^=(b)$: retrieve objects assigned to block b |
| 2 | $\mathcal{P}_{anc}(b)$: retrieve objects assigned to (strict) ancestors of block b |
| 3 | $\mathcal{P}_{desc}(b)$: retrieve objects assigned to (strict) descendants of block b |

For queries 1-3 listed in Table 2 above, $\mathcal{P}_{anc}^+(b):=\mathcal{P}=(b)\cup\mathcal{P}_{anc}(b)$ and $\mathcal{P}_{desc}^+(b):=\mathcal{P}=(b)\cup\mathcal{P}_{desc}(b)$ denotes the non-strict variants of $\mathcal{P}_{anc}(b)$ and $\mathcal{P}_{desc}(b)$, respectively. Queries 1-3 can be defined for any linearization. However, more precise definitions specific to the Morton curve are provided below.

In an embodiment, the Morton ordering assigns each block b to a variable-length binary key denoted as $M_{ORTON}K_{EY}(b)$. Queries 1-3 listed in Table 2 above can be expressed in terms of variable-length Morton keys as indicated in Table 3 below.

TABLE 3

Quadtree Block Retrieval Queries in Terms of Morton Keys

| Query no. | Query in terms of Morton Keys |
|---|---|
| 1 | $\mathcal{P}^=(b):=\{MORTONKEY(b)\}$ |
| 2 | $\mathcal{P}_{anc}(b):=\{k \mid k \text{ is a (strict) prefix of MORTONKEY}(b)\}$ |
| 3 | $\mathcal{P}_{desc}(b):=\{k \mid MORTONKEY(b) \text{ is a (strict) prefix of } k\}$ |

According to an embodiment, Morton keys of length N−lg (N) or less can be encoded as N-bit integers. Fixed-width index key $K_{EY}(b)$ is constructed by left-aligning $M_{ORTON}K_{EY}(b)$ within the first N−lg(N) bits (post-padding with zeros) and using the right-most lg(N) bits to encode the length of $M_{ORTON}K_{EY}(b)$.

It is important to note the following three observations about Morton index keys. Let b be any quadtree block, with sub-blocks $b_0$ and $b_1$. For example, b may be block 530 depicted in FIG. 5 with $b_0$ and $b_1$ being the first and second sub-blocks 538. First, $K_{EY}(b)<K_{EY}(b_0)<K_{EY}(b_1)$. As a result, all of a block's ancestors precede it in index key order, while all of its descendants succeed it. This is depicted in FIG. 5 with reference to space 528, block 530, and sub-blocks 538. Second, $K_{EY}(b_0)=K_{EY}(b)+1$. In other words, each key is adjacent to the key of its 0-child. As a result, any index range plan that retrieves both keys $K_{EY}(b)$ and $K_{EY}(b_0)$ can do so with a single range. Third, let $M_{AX}D_{ESCENDANT}K_{EY}(b)$ denote the maximal key among all descendants of block b. Then, the following characteristics are true: every integer within the range $[K_{EY}(b); M_{AX}D_{ESCENDANT}K_{EY}(b)]$ agrees with the leftmost depth(b) bits of $K_{EY}(b)$; all descendants of b have Morton index keys within the range $[K_{EY}(b); M_{AX}D_{ESCENDANT}K_{EY}(b)]$; and every integer within the range $[K_{EY}(b); M_{AX}D_{ESCENDANT}K_{EY}(b)]$ is either the key of b, the key of block b's descendants, or is not a valid Morton index key.

Based upon the above observations, queries 1-3 from Tables 2 and 3 can be characterized more precisely in terms of fixed-width Morton keys. For example, query 1 is an index range plan containing the single equality probe $K_{EY}(b)$. Also, query 2 is an index range plan containing n ranges, where n+(# of 1-bits in $M_{ORTON}K_{EY}(b)$)). Lastly, query 3 can be expressed as an index range plan containing the single range $K_{EY}(b); M_{AX}D_{ESCENDANT}K_{EY}(b)]$. This range may contain integer values that are not keys of descendant sub-blocks of b, but those integers are not valid Morton index keys and so can be safely added to the index range plan without changing the query result. That is, the query result stored in result set 262 will not be changed as a result of this index range plan.

Figure 8:
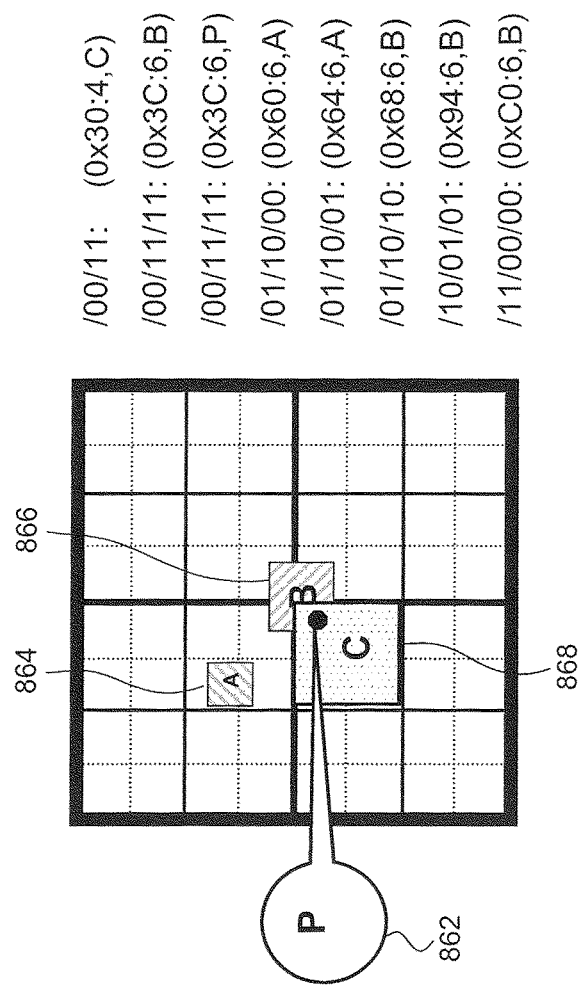
FIG. 8 depicts stabbing queries with object decomposition.
Figure 8:
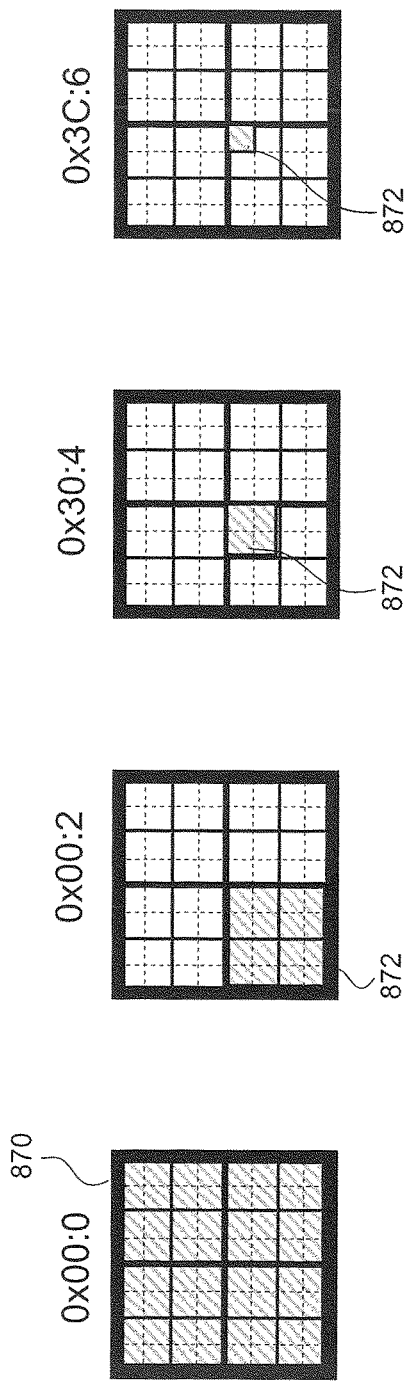

FIG. 8 depicts operation of a stabbing query for a point with object decomposition. FIG. 8 is described with continued reference to the embodiment illustrated in FIG. 2. FIG. 8 illustrates operation of an exemplary stabbing query for a particular point, point 862.

FIG. 8 illustrates a method for finding all objects that overlap with point 862. Since the tessellation for an object covers the object, there must be a tile in the object that covers point 862. In an embodiment, after receiving a stabbing query, parsed by query parser 210, point 862, database engine 132 finds all polygons (i.e., geometry objects 252) in database storage 134 that include point 862. Such stabbing queries may be used to determine one or more polygons that include a particular point, such as, for example a city, county, state, region, and/or country that include point 862.

As shown in FIG. 8, polygons 866 and 868 contain point 862, but polygon 864 does not. The Morton key of point 862 is /00/11/11, which has hexadecimal address 0x3C:6. The 4-bit Morton key of polygon 868, which is four times larger than polygon 866, is /00/11. As shown in FIG. 8, the Morton keys of Morton blocks making up polygon 866 are /00/11/11, /01/10/10, /10/01/01, and /11/00/00. The Morton keys for the Morton blocks comprising polygon 864 are /01/10/00, /01/10/01, and /01/10/10.

In an example, the stabbing query may be expressed as "Stab P: X IN (0x00:0, 0x00:2, 0x30:4, 0x3C:6)", where P is point 862 and the four hexadecimal (hex) addresses correspond to Morton keys for space 870, two of its sub-blocks 872, and point 862, respectively. The result of evaluating and executing this query is shown in space 870 and its sub-blocks, including Morton block 872. A sub-block 872 having hex address 0x00:2 and containing point 862 is shown to the right of space 870. Point 862 is contained within polygon 868 having Morton key /00/11 and hex address 0x30:4. Point 862 is also in the sub-block with Morton key /00/11/11, which has hex address 0x3C:6. The location of the smallest Morton block containing point 862 which is shown as sub-block 872 in the lower right hand portion of FIG. 8.

Three types of queries using spatial objects can be described with reference to FIG. 8. Besides the stabbing query discussed above, stabbing queries can interact with object decomposition. For example, a stabbing query can be generalized to query for polygon 864 instead of just point 862.

Using hex addresses corresponding to the Morton keys shown in FIG. 8, polygon 864 may be represented as a pair of ranges: [0x60:6, 0x64) and [0x64:6, 0x68). These two ranges can be combined into the single range [0x60:6, 0x68) because they are adjacent. Similarly, polygon 866 can be represented as four ranges: [0x3C:6, 0x40), [0x68:6,0x6C), [0x94:6, 0x9C), [0xC0:6,0xC4) and polygon 868 can be represented as the range [0x30:4, 0x40).

With continued reference to FIG. 8 a generalized stabbing query for all objects that interact with polygon 864 in any way can be represented as: X IN (0x00:0, 0x40:2, 0x60:4, [0x60:6, 0x68)). This example query searches for cells containing polygon 864 and also searches for cells that are contained within the blocks associated with polygon 864. This query is a combination of a stabbing query and a containment query.

As shown in FIGS. 5-8, linear quadtree indexes can be used with queries for geometry objects 252. Such geometry objects 252 can be tessellated into index rows. In an embodiment, geometry objects 252 are covered by tiles (i.e., tessellated). In an embodiment, tunable parameters, such as parameters entered by a database designer or database administrator (DBA) control the depth/tile size for tessellation. As discussed with reference to FIG. 8 above, stabbing queries can be IN-list predicates, such as spatial predicates 260. Stabbing queries identify all ancestor tiles containing a point, such as point 862. Containment queries are a sequence of ranges, wherein for each tile in the query, all contained tiles are returned. Additionally "any interaction" queries require IN and ranges (i.e., a combination of stabbing and containment queries). For these combination "any interaction" queries, ancestor tiles may overlap with the query and contained tiles may be overlapped.

Spatial predicates 260 that are IN sargable predicates can be extended. Such extension of sargable predicates to a sequence of ranges is represented below:

X IN (4, 7, 11)→virtual table with index scan

This can be extended to ranges: X IN ([4,4], [7,10), (21, 30)), wherein the ranges should be non-overlapping so that duplicates in result rows are avoided. In this way duplicate data in result set 262 are avoided.

In an embodiment, combining ranges is considered, even if this could return extra rows from the spatial index 240. Extra rows can be rejected by post-filters, such as filter 230. This reduces index probes at the cost of extra rows.

IV. Query Decomposition

Figure 9:
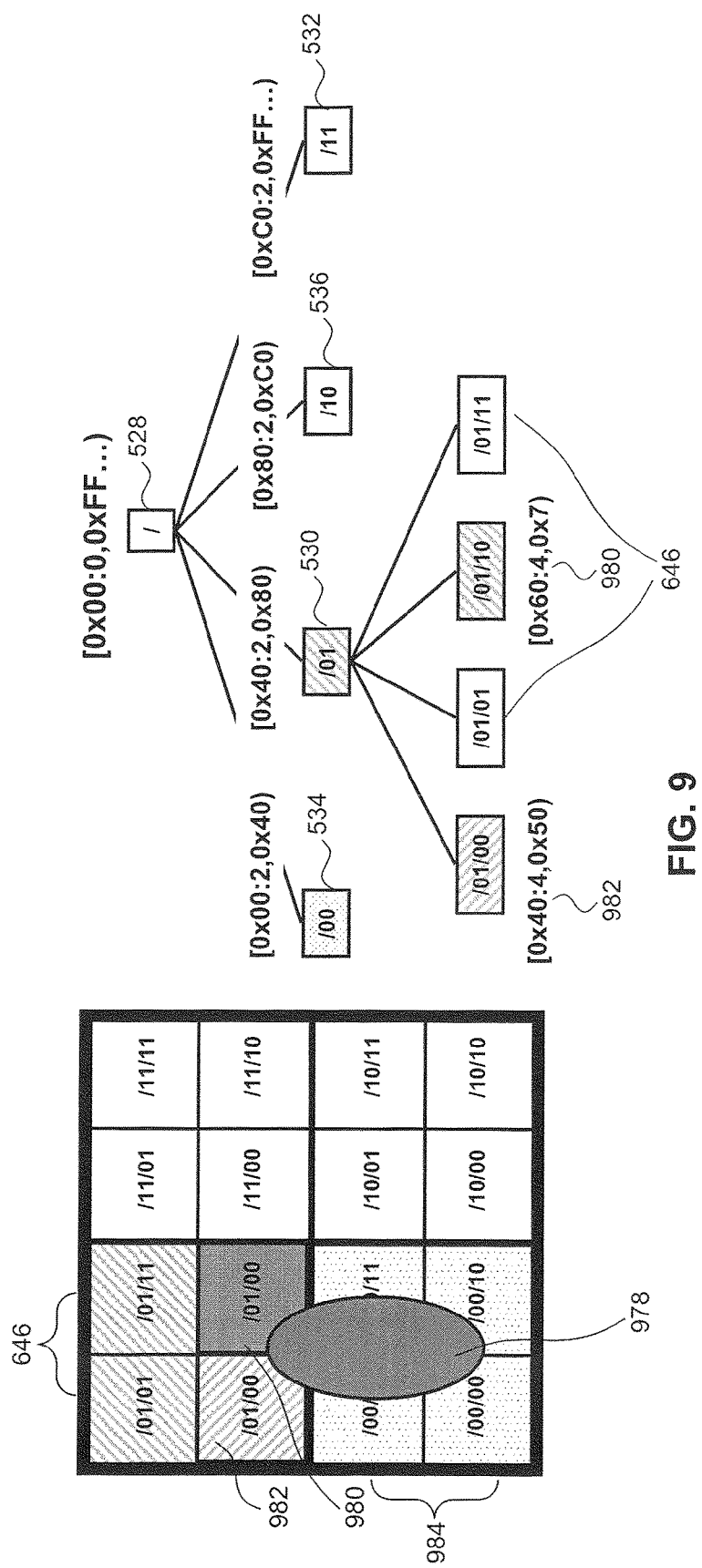
FIG. 9 depicts data-directed range decomposition, in accordance with an embodiment of the invention.

FIG. 9 depicts an example of performing data-directed range decomposition, in accordance with an embodiment of the invention. In particular, FIG. 9 illustrates data-directed decomposition of a query object 978. FIG. 9 is described with continued reference to the embodiment illustrated in FIGS. 2 and 5-6. However, FIG. 9 is not limited to those embodiments.

According to an embodiment, a range width can be chosen, wherein the range width indicates the number of probes vs. number of leaves. In one embodiment, this choice of range width is made at run-time by execution unit 220. For example, execution unit 220 may estimate the number of rows in ranges based on trails. In an embodiment of the present invention, range decomposition could be done using histograms. For example, range decomposition can be done at query execution time using storage statistics, wherein the storage statistics are represented as histograms. The simplest strategy for executing a query with object o, for example, query object 978, is to approximate query o as block b=$\text{B}_{\text{LOCK}}$(o) (i.e., to not decompose o). In this scenario, the three fundamental queries, intersection query $Q_{INTERSECTS}$(o), containment query $Q_{CONTAINS}$(o), and within query $Q_{WITHIN}$(o), can be translated directly to the index range plans provided in Table 4 below.

TABLE 4

Index Range Plans

| Query | Range Plan |
|---|---|
| $Q_{INTERSECTS}$(b) | $\mathcal{P}_{anc}^+$(b) ∪ $\mathcal{P}_{desc}^+$(b) |
| $Q_{CONTAINS}$(b) | $\mathcal{P}_{desc}^+$(b) |
| $Q_{WITHIN}$(b) | $\mathcal{P}_{anc}^+$(b') where b' is any maximally-deep descendent of b |

In the definition of $Q_{WITHIN}$(b) shown in Table 4, the depth of block b' is a property of the index (determined by key length, such as the Morton key length). The use of block b' is necessary to handle decomposed data objects, such as geometry objects 252 because if a data object o' contains o (which implies DEPTH($\text{B}_{\text{LOCK}}$(o'))≤DEPTH(b)), object o' may be stored in an index, such as a spatial index 240, as a set of sub-objects which all belong to blocks deeper than b. If data objects are not decomposed, then $Q_{WITHIN}$(b) can be simplified as follows: $Q_{WITHIN}$(b):=$\mathcal{P}_{anc}^+$(b).

As shown in FIG. 9, query object 978 for a range of data spanning sub-blocks 980 and 982 within block 646 and all 4 sub-blocks within block 984 can be decomposed instead of decomposing a geometry object. In the binary tree (B-Tree) of FIG. 9, sub-block 980 at hex address [0x60:4,0x7) and sub-block 982 at hex address [0x40:4,0x50) within parent block 530 in space 528 are found using existing indexes within the B-Tree. In the embodiment illustrated in FIG. 9, it is the query object 978 that is decomposed instead of a geometry object, as discussed above.

Block b=$\text{B}_{\text{LOCK}}$(o) may be a very poor abstraction for object o. As a result, the index range plans generated for queries $Q_{INTERSECTS}$(b) and $Q_{CONTAINS}$(b) may contain very large ranges, which increases the number of false positives in the result and possibly increases execution cost due to long index scans. For this reason, it is desirable to decompose query object o.

For example, let O={$o_1$, : : : , $o_n$} be any decomposition of query object o. The translation of fundamental queries to index range plans from Table 4 can be extended to decomposition O as follows:

$$Q_{INTERSECTS}(O) := \bigcup_i Q_{INTERSECTS}(\text{BLOCK}(o_i))$$

$$Q_{CONTAINS}(O) := Q_{INTERSECTS}(O) \setminus \mathcal{P}_{anc}(\text{BLOCK}(o))$$

$$Q_{WITHIN}(O) := Q_{WITHIN}(\text{BLOCK}(o))$$

It is notable that within queries never benefit from query object decomposition.

An exemplary algorithm for optimal query decomposition is provided in Table 5 below.

TABLE 5

Algorithm 2 for General Algorithm for Optimal Query Decomposition

OPTIMALPLAN(o, t) returns ($\mathcal{P}$)
    ▷ Input: Query object o
    ▷ Input: Query type t ∈ {INTERSECTS, CONTAINS, WITHIN}
    ▷ Output: Least-cost index range plan $\mathcal{P}$
1    $\mathcal{P} \leftarrow Q_t(\text{BLOCK}(o))$
2    for each possible decomposition O of o
3        do if COST($Q_t(O)$) < COST(P)
4            then $\mathcal{P} \leftarrow Q_t(O)$
5    return $\mathcal{P}$ According to an embodiment of the invention depicted in FIG. 9 and in Tables 4 and 5, decomposition of data geometry objects 252 is not used. Instead, the method seeks to cover a data geometry object with the smallest cell that covers it, as discussed with reference to FIG. 10 below. In an embodiment, data-directed decomposition of a query geometry object is performed by using existing B-Tree indexes. For example, an index hash for an object is its Morton block id, and all descendants of that block can be retrieved from a B-Tree index using a single index key range. More fine-gained tessellation of the query geometry object may yield one or more smaller Morton blocks corresponding to smaller key ranges within the B-Tree index. The increased number of key ranges introduces execution overhead, but this additional expense may or may not be recouped by a reduction in the total number of data objects retrieved (due to data objects whose keys lie within the single large range but not within any of the smaller ranges). Such data-directed query decomposition refines ranges on a cost basis at execution time. For example, the ranges may be defined by execution unit 220 at run-time. In an embodiment, a method for object decomposition uses approximations in a database table 250 for a secondary filter, which may be a filter 230 within database engine 132. According to an embodiment, indexes are supported with extra columns in one or more database tables 250.

Figure 10:
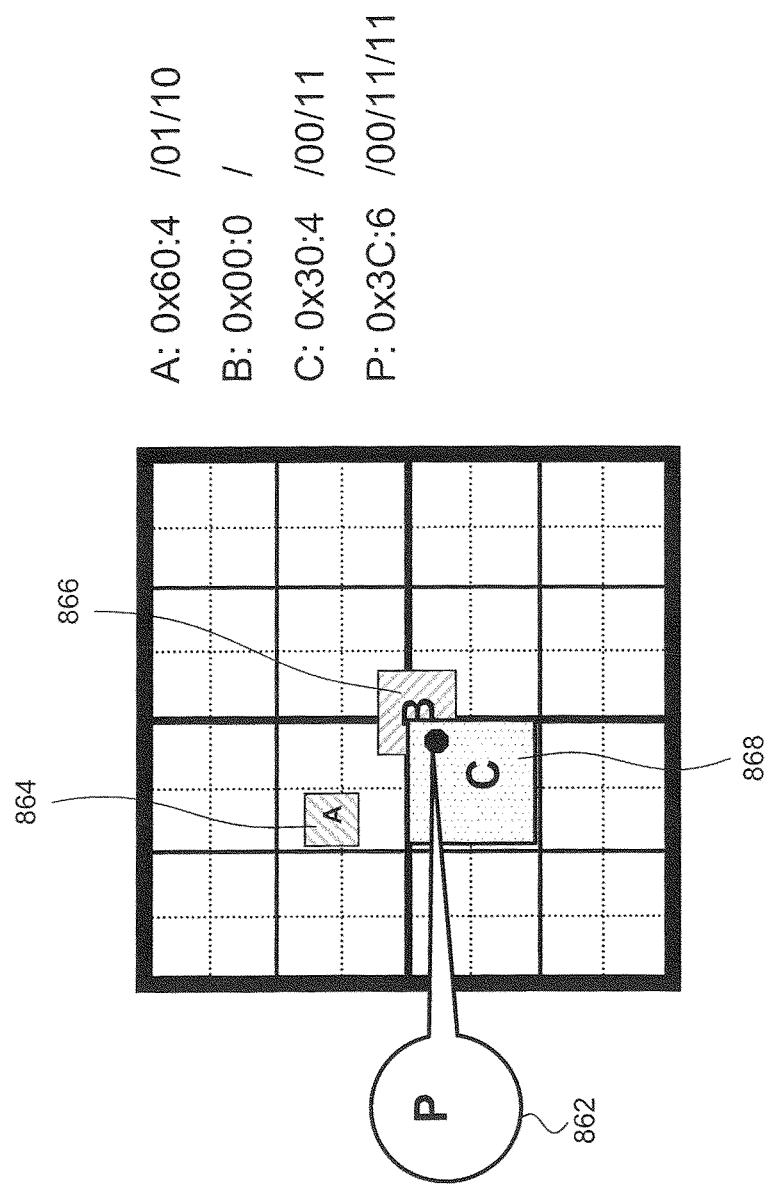
FIG. 10 depicts a stabbing query on a quadtree index storing non-decomposed spatial objects, according to an embodiment of the invention.

FIG. 10 illustrates a stabbing query on a quadtree index, according to an embodiment of the invention. In particular, FIG. 10 shows how all polygons 866 and 868 that overlap point 862 are found. FIG. 10 is described with continued reference to the embodiment illustrated in FIG. 8. However, FIG. 10 is not limited to that embodiment.

Since the tessellation for an object covers the object, there must be a tile in the object that covers a particular point, such as point 862. An object, such as polygon 864 is associated with smallest enclosing tile. As shown in FIG. 10, polygon 866 is at the root level. Thus, according to an embodiment, polygon 866 will be returned by every stabbing or interact query. In an embodiment, points such as point 862 are always fully elaborated.

Although the preceding section defines how each possible decomposition of the query object yields a different index range query, it does not provide guidance as to which decomposition to select. The choice of query decomposition can greatly affect query performance, but the choice is difficult to make heuristically. This is because while overly coarse-grained decompositions may incur high scanning costs, overly fine-grained decompositions can be equally expensive due to a large number of separate index probes. In order to minimize execution cost, in an embodiment, database system 100 must choose the decomposition of the query object that yields the optimal index range plan, where optimality is defined relative to the abstract plan-costing function $C_{OST}(P)$ provided by the database system 100. Algorithm 2 in table 5 above illustrates a high-level description of an algorithm that performs this task. According to an embodiment, this algorithm can be applied to queries over any linearized quadtree index, independent of the chosen linearization or whether or not data objects are decomposed. The final plan output by Algorithm 2 corresponds to a particular query decomposition, but this chosen decomposition is identified by the plan-costing function. This is crucial, because the cost function can encapsulate knowledge specific to the data objects (e.g., number of data objects, statistical distribution of key values) as well as the current system context (e.g., system load, how much of a spatial index 240 is in memory, etc.). In this way, algorithm 2 automatically adapts to changes in the underlying data or system context (to the degree that these changes are reflected in the cost model for database system 100).

While Algorithm 2 provides a high-level description of an algorithm for selecting the optimal execution plan for a query, in some contexts, it may be too abstract to implement efficiently. In particular, a query could have a very large number of distinct decompositions (super-exponential in the maximum index key size), but Algorithm 2 enumerates them exhaustively. As well, naively applying the formulae from Table 4 and the discussion of FIG. 9 above to generate index range plans can be very inefficient, because no construction effort is shared between index range plans that are similar.

Algorithm 3 provided in Table 6 below illustrates an efficient, detailed implementation of Algorithm 2 specific to the case of a quadtree index based upon a Morton key encoding which contains non-decomposed data objects. Algorithm 3 includes the following three enhancements:

1) Enumeration of all possible object decompositions is performed by a single recursive depth-first traversal of the (logical) quadtree.
2) The index range plan is efficiently assembled incrementally at each step of the recursive traversal. Knowledge of the Morton key ordering is used to merge adjacent key ranges whenever possible.
3) Branch-and-bound pruning is used to prune the search space while retaining optimality of the search. Monotonicity of the cost model guarantees that plan costs increase as the traversal proceeds down the quadtree, and so at each step in the recursion it is safe to backtrack whenever the cost of the current (partially constructed) plan exceeds the cost of a plan that spanned an entire ancestor block. In an embodiment of the invention, an upper bound can be set, i.e., by a database administrator or user, and used to determine if backtracking needs to occur.

TABLE 6

Algorithm 3 for Detailed Algorithm for Optimal Query Decomposition

OPTIMALMORTONPLAN(o, t) returns ($\mathcal{P}$)
    ▷ Input: Query object o
    ▷ Input: Query type t ∈ {INTERSECTS, CONTAINS, WITHIN}
    ▷ Output: Least-cost index range plan $\mathcal{P}$
1    b ← root quadtree block
2    return RECURSIVESEARCH(b, o, t, ∅, FALSE, ∞)
RECURSIVESEARCH(b, o, t, $\mathcal{P}_{pre}$, isAdjacent, upperBound) returns ($\mathcal{P}$)
    ▷ Input: Quadtree block b
    ▷ Input: Query object o
    ▷ Input: Query type t ∈ {INTERSECTS, CONTAINS, WITHIN}
    ▷ Input: Index range plan $\mathcal{P}_{pre}$
    ▷ Input: Boolean isAdjacent
    ▷ Input: Cost upperBound TABLE 6-continued Algorithm 3 for Detailed Algorithm for Optimal Query Decomposition ▷ Output: Index range plan $\mathcal{P}$ extends $\mathcal{P}_{pre}$ to block b. If the optimal extension $\mathcal{P}_{opt}$ has COST($\mathcal{P}_{opt}$) < upperBound, then $\mathcal{P} = \mathcal{P}_{opt}$

```
1    𝒫_whole ← 𝒫_pre
2    if isAdjacent
3      then extend final range in 𝒫_whole to
         MAXDESCENDANTKEY(b)
4      else append range [KEY(b), MAXDESCENDANTKEY(b)]
         to 𝒫_whole
5    if DEPTH(b) ≥ MAXIMUMBLOCKDEPTH
6      then return 𝒫_whole
7    upperBound ← min(upper Bound, COST(𝒫_whole))
8    𝒫_decomp ← 𝒫_pre
9    (b_0, b_1) ← PARTITION(b)
10   o_0 ← intersection of o and b_o
11   o_1 ← intersection of o and b_1
12   needB ← (t ≠ CONTAINS or (o_0 and o_1 both non-empty))
13   needB_0 ← (o_0 non-empty and (t ≠ WITHIN or o_1 empty))
14   needB_1 ← (o_1 non-empty and (t ≠ WITHIN or o_0 empty))
15   if needB
16     then if isAdjacent
17        then extend final range in 𝒫_decomp to KEY(b)
18        else append range [KEY(b), KEY(b)] to 𝒫_decomp
19        if COST(𝒫_decomp) ≥ upperBound
20          then return 𝒫_whole
21   if needB_0
22     then 𝒫_decomp ← RECURSIVESEARCH( b_o, o_o, t, 𝒫_decomp, needB,
         upperBound )
23        if COST(𝒫_decomp) ≥ upperBound
24          then return 𝒫_whole
25   if needB_1
26     then isAdjacent ← (final endpoint of 𝒫_decomp =
         MAXDESCENDANTKEY(b_o))
27        𝒫_decomp ← RECURSIVESEARCH( b_1, o_1, t, 𝒫_decomp,
         isAdjacent, upperBound )
28        if COST(𝒫_decomp) ≥ upperBound
29          then return 𝒫_whole
30   return 𝒫_decomp
```

In an embodiment, query object decomposition assists in reducing (or eliminating) the need for tuning parameters for spatial indexes 240, because parameters governing geometry object tessellation are chosen dynamically at query execution time, rather than specified at index creation time. In an embodiment, a column definition has a unique identifier (i.e., an SRID) with space bounds such that all geometries in the column are within the known bounds. Optimal tessellation depends on the data stored in database storage 134. In an embodiment, data geometry objects 252 are not decomposed (i.e., are assigned to the single smallest block). Instead, query objects are decomposed according to the data distribution as described above with reference to FIGS. 9 and 10. Although Morton hierarchy origin can cause bad overlaps, in an embodiment, the use of a secondary hierarchy with origin translated addresses this issue and also helps to avoid the need for tuning parameters.

While tuning parameters are largely avoided as a result of implementing the query object decomposition discussed above, in order to decompose the query object, in an embodiment, an optimizer is used. In a non-limiting embodiment, the Optimizer of SYBASE™ SQL ANYWHERE™ can be used as the optimizer discussed herein. The optimizer needs certain inputs or knowledge in order to generate efficient probe plans. One such input is the relative selectivity of a spatial predicate 260. For example, this may be based on a 2D histogram, such as the histogram provided in FIG. 14. The optimizer can use a spatial index 240 for estimation as well.

Another input needed by the optimizer is the cost of an index scan (for multiple ranges). For example, in cases where it is easy to generate an upper bounds, that may suffice for use as the cost of the index scan.

The optimizer also needs to know the cost of evaluating a precise spatial predicate 260. If the cost is determined to be computationally expensive; the evaluation may be deferred. According to an embodiment, the optimizer may use predicate inference rules. In another embodiment, the predicate matching rules for materialized views may accommodate spatial predicates. Currently available products, such as SYBASE™ SQL ANYWHERE™ support materialized views. A materialized view can be refreshed by complete re-computation and may be defined by any complex query. However, the SQL ANYWHERE™ Optimizer can use only a certain class of materialized views in the view matching process during query optimization. Spatial join estimation can also aid the optimizer in avoiding the need for tuning parameters.

Figure 11:
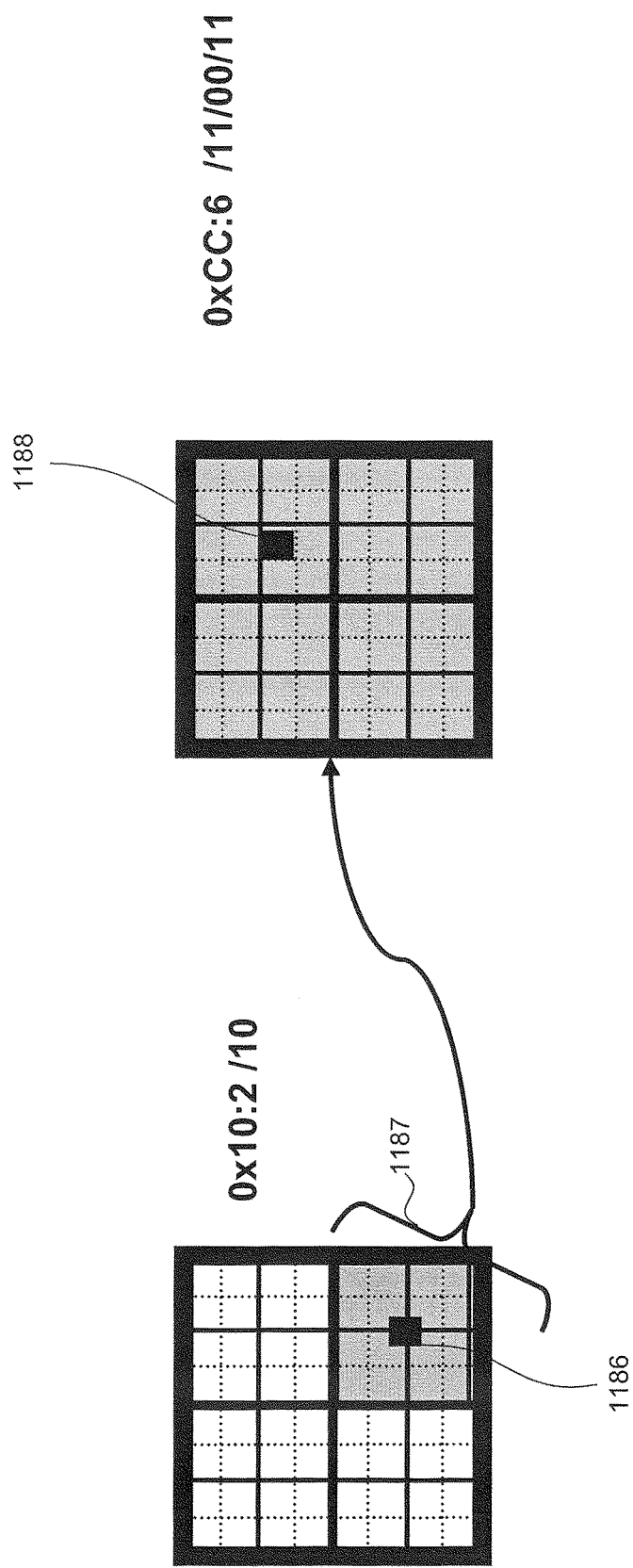
FIG. 11 illustrates use of a secondary code to handle small spatial objects near large intersections, according to an embodiment of the invention.

FIG. 11 illustrates using a secondary code to handle small spatial objects near large intersections, according to an embodiment of the invention. As shown in FIG. 11, even small geometry objects 252 such as object 1186 may have large cells. This is because object 1186 is near the major intersection of Morton block 1187.

According to an embodiment, small objects near large intersections can be found using a secondary code. For example, within the Morton block 1187 containing object 1186, a subordinate hierarchy can be defined. In this embodiment, coordinates are translated by approximately ½ to move major intersections. In another embodiment, a different space filling curve (i.e., besides Morton) can be used as well.

V. Performance Results

FIGS. 12-16 provide performance results for a case study using spatial quadtree indexes. In particular, these Figures indicate the number of rows returned from spatial quadtree indexes for queries for spatial data.

The results shown in FIGS. 12-16 are based on a large data set of spatial data representing polygons within California. The data for the case study included 30 million points, and 3 million edges. From this data, a computed column is a 64-bit Morton block key which was evaluated using an external function. The spatial index 240 was a clustered index on Morton blocks.

Figure 12:
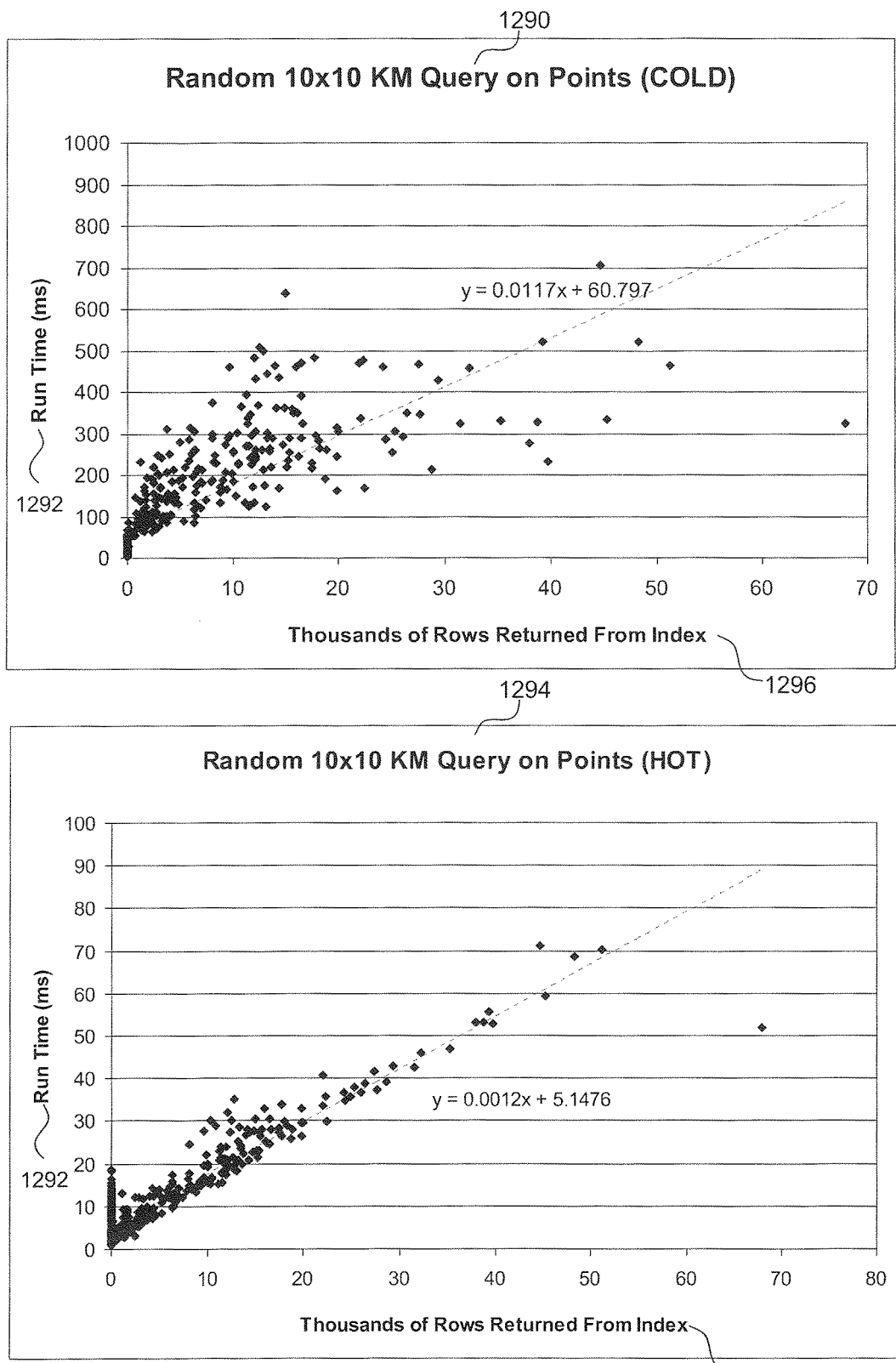
FIGS. 12-16 are graphs providing performance results for a case study using quadtree spatial indexes with queries for data representing spatial objects in California.

As shown in scatter plot graph 1290 of FIG. 12, the run time 1292 for a query on points with a cold cache against a 10 by 10 kilometer (KM) space was about 60 milliseconds (ms) with a slope of approximately 12 microseconds (μs)/row. The rows returned 1296 from the cold cache query are also shown in graph 1290.

As shown in scatter plot 1294, run time 1292 for a query on points with a hot cache was approximately 5 ms+1 μs/row slope. The thousands of rows returned 1294 from the hot cache query are also shown in scatter plot 1294.

Row counts indicated in FIG. 12 were returned from a spatial index 240, but they did not necessarily match the query in all cases. The rows truly matching the query are shown as matching rows 1398 in scatter plot 1397 of FIG. 13. The corresponding numbers of rows returned 1399 from the index are provided on the X-axis of scatter plot 1397.

Figure 13:
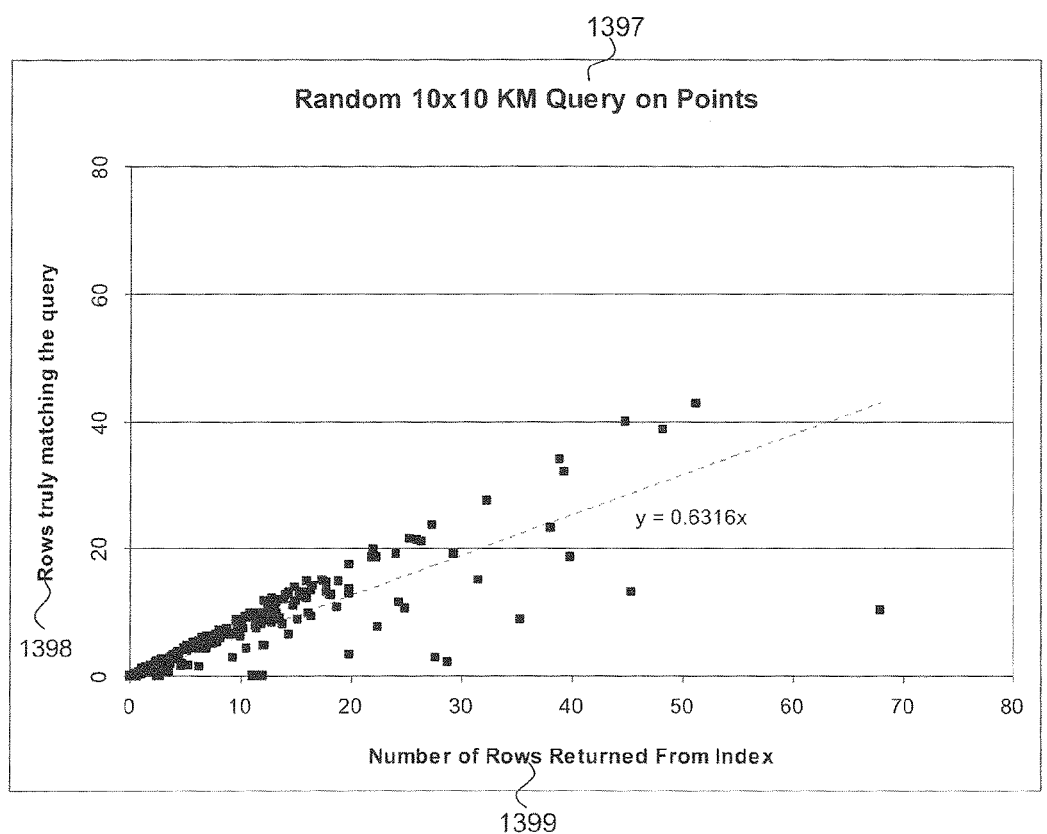

With continued reference to FIGS. 12-13, the results indicate that while queries return false positives, this is controlled by the IN operator discussed above. Also, rows can be quickly rejected using a secondary filter, as described above with reference to FIG. 9. As shown in FIG. 12, performance of the spatial quadtree index, measured as run time 1292, is excellent.

Figure 14:
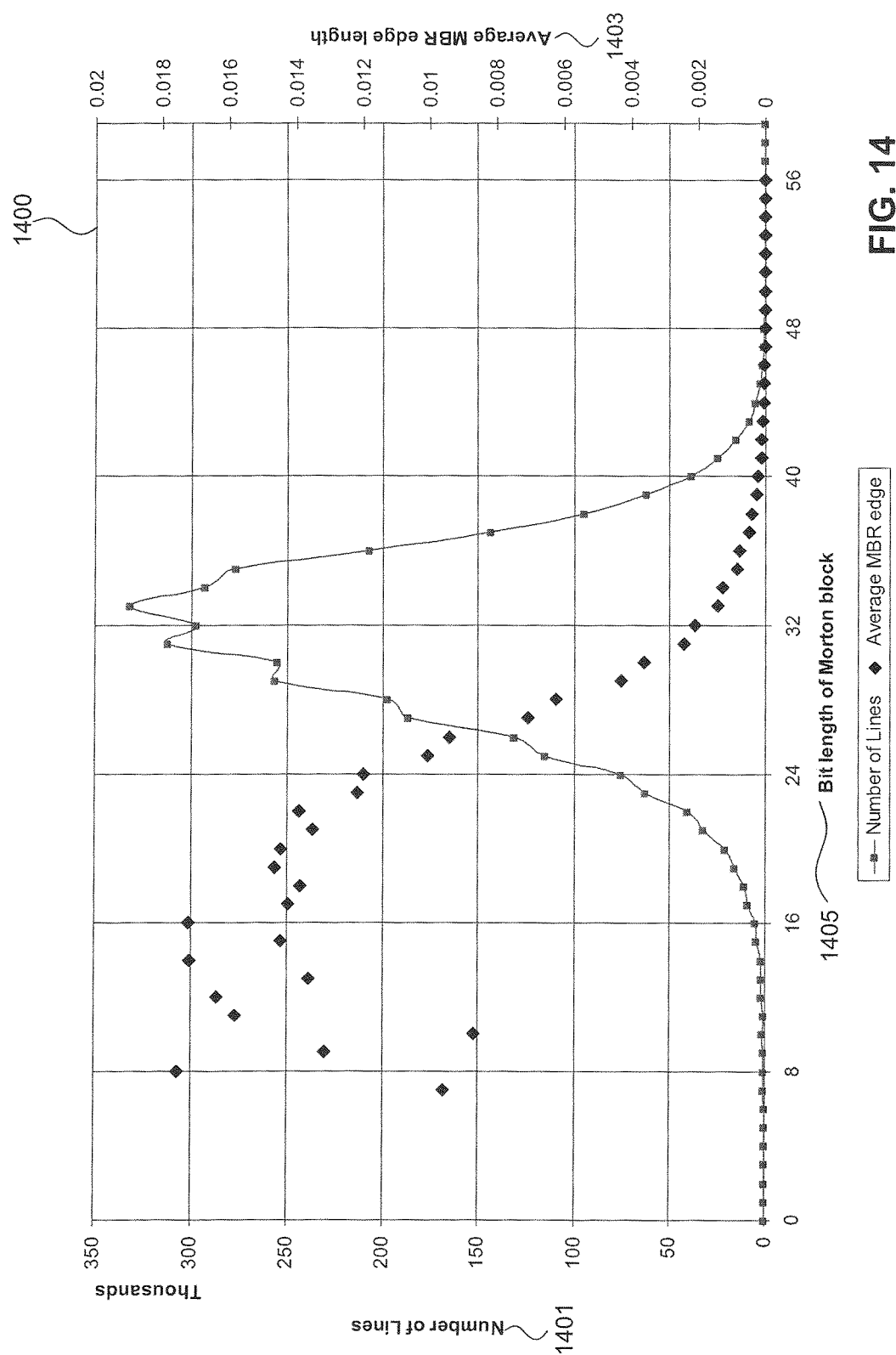

FIG. 14 provides a 2D histogram 1400 indicating the distribution of objects by bit length of a Morton block. As shown in FIG. 14, the number of lines 1401, bit length of a Morton block 1405 and average Morton block edge length 1403 are displayed for the number of lines and the average Morton block edge so as to convey the distribution of objects for Morton blocks with bit lengths ranging from 0 to 56.

Figure 15:
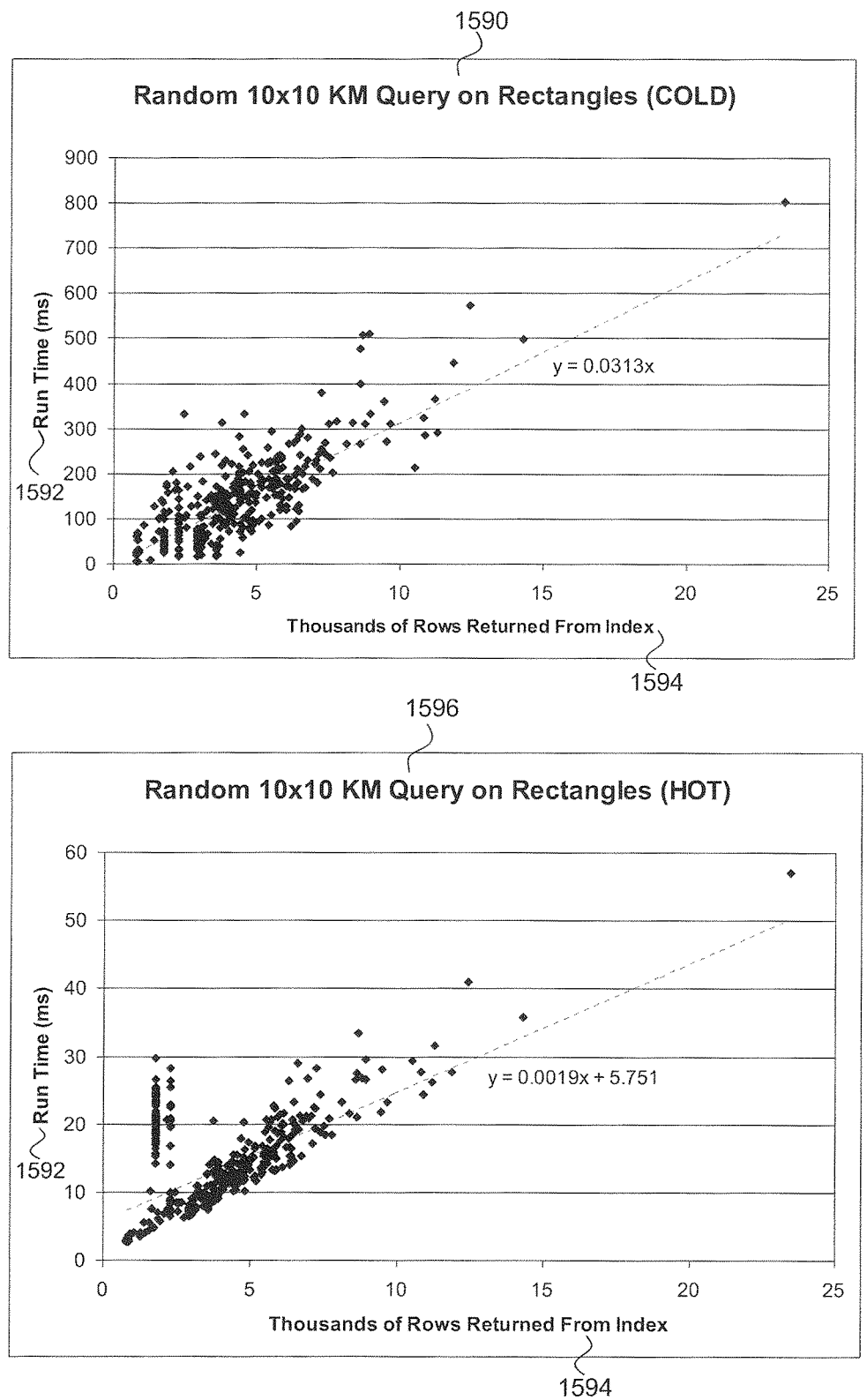
Figure 16:
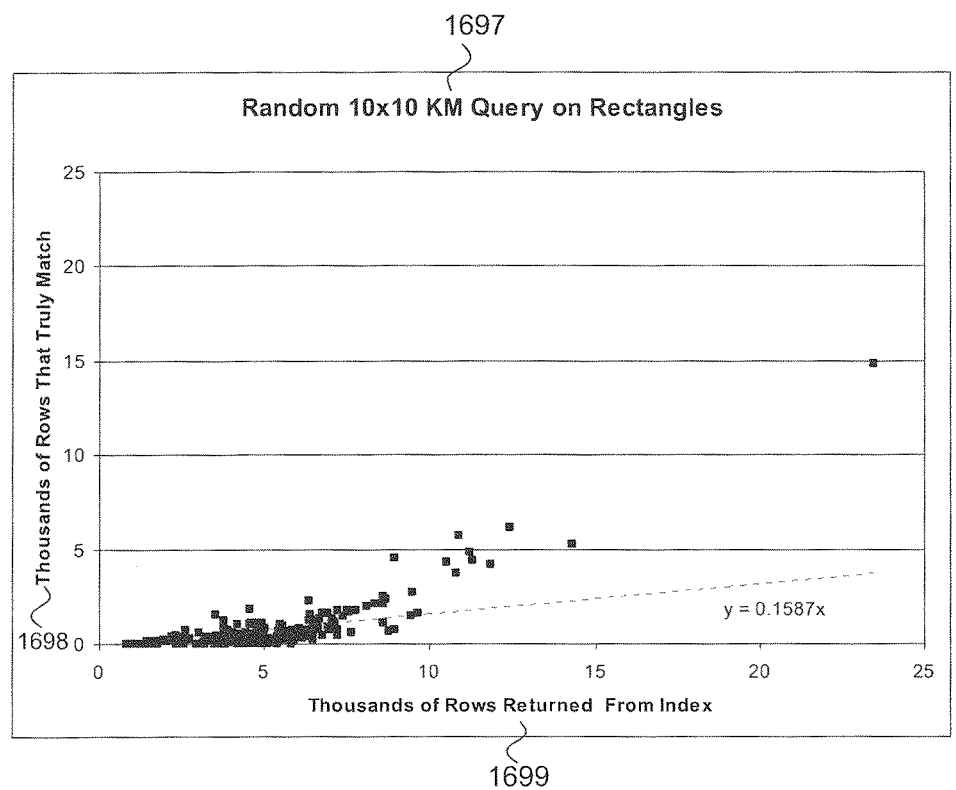

FIGS. 15 and 16 are scatter plots depicting the performance of queries on rectangle geometry objects within the spatial data.

As shown in scatter plot graph 1590 of FIG. 15, the run time 1592 for a query on rectangles with a cold cache against a 10 by 10 KM space was about 90 ms+31 µs/row slope. The rows returned 1594 from the cold cache query are also shown in graph 1590.

As shown in scatter plot 1596, run time 1592 for a query on rectangles with a hot cache was approximately 6 ms+2 µs/row slope. The thousands of rows returned 1594 from the hot cache query are also shown in scatter plot 1596. As was the case with the point queries discussed above with reference to FIG. 12, the counts of rows returned 1594 are returned from an index and therefore do not necessarily match the query.

The rows truly matching the query on a rectangle are shown as matching rows 1698 displayed on the Y-axis of scatter plot 1697 of FIG. 16. The corresponding numbers of rows returned from the index 1699 are provided on the X-axis of scatter plot 1697.

VI. Example User Interface for Spatial Index Creation

FIGS. 17-23 illustrate graphical user interfaces (GUIs), according to an embodiment of the present invention. The GUIs depicted in FIGS. 17-23 is described with reference to the embodiments of FIGS. 1-11. However, the GUIs are not limited to those example embodiments.

Throughout FIGS. 17-23, displays are shown with various icons, command regions and buttons that are used to initiate action, invoke routines, launch displays, view index details, scroll through lists of indexes, view lists of table columns, view query plans, view predicates, view spatial data, or invoke other functionality. The initiated actions include, but are not limited to, spatial index creation, viewing predicates, viewing query plans, viewing spatial data, and other inputs. For brevity, only the differences occurring within the figures, as compared to previous or subsequent ones of the figures, are described below.

FIGS. 17-21 illustrate an exemplary graphical user interface (GUI) 1700 wherein spatial quadtree indexes can be created, in accordance with an embodiment of the invention. As shown in the exemplary embodiment of FIG. 21, no special syntax is used in generated CREATE INDEX SQL statements to create spatial indexes 240. In particular, no tuning directives (i.e., knobs or dials are needed within the GUI for tuning parameters) are needed. Geometry columns usually last in indexes displayed in GUI 1700 and later columns can still be used in some queries. Indexes created in GUI 1700 with geometry columns benefit from being clustered, as existing index hints work to force particular indexes. As would be understood by those skilled in the relevant art(s), such clustering of indexes serves to increase performance of spatial indexes 240.

Figure 17:
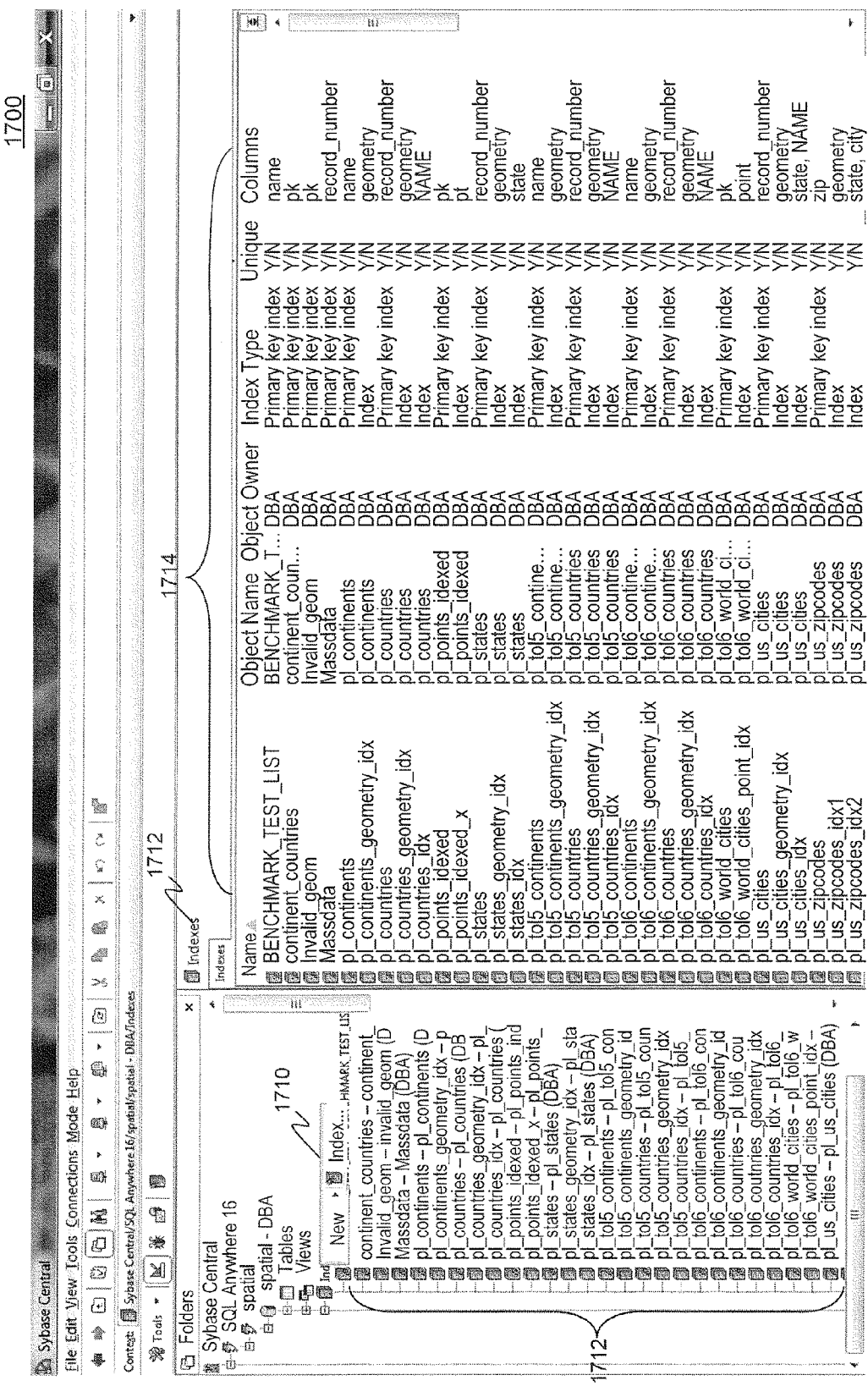
FIGS. 17-21 illustrate an exemplary graphical user interface (GUI), wherein spatial quadtree indexes can be created, in accordance with an embodiment of the invention.

FIG. 17 illustrates an exemplary spatial index creation interface 1700 for creating a spatial index 240. Spatial index creation interface 1700 includes index list 1712 of spatial indexes.

In an embodiment of the invention, spatial index creation interface 1700 illustrated in FIGS. 17-21 is displayed on client 110a having display device 112a or mobile client 110b having display device 112b. For ease of explanation, the operation of list view interface 1700 is discussed in the context of a computing platform running the SYBASE™ SQL Anywhere™ RDBMS from Sybase, Inc. of Dublin, Calif., but is not intended to be limited thereto.

Although in the exemplary embodiments depicted in FIG. 17 the spatial index creation interface 1700 is shown as a computing device interface running in a Windows operating system (OS), it is understood that the GUI can be readily adapted to execute on a display of other platforms and operating systems.

In the exemplary embodiment of FIG. 17, a spatial index list 1712 is displayed vertically in a pane within GUI 1700, and spatial index data 1714 is displayed horizontally in a pane to the right of spatial index list 1712. As shown in FIG. 17, spatial index data 1714 can include, but is not limited to, an index name, an object name, the object owner, an index type (i.e., primary key), index uniqueness constraints, null properties, distinctness properties, and columns indexed. When a user, using an input device (not shown), selects the new object icon (i.e., the folder icon in the toolbar of GUI 1700), new index dialog 1710 is displayed. Upon selection of the new index command area within new index dialog 1710, a create index wizard is launched.

FIGS. 18-21 illustrate an exemplary create index wizard 1816, in accordance with an embodiment of the invention.

Figure 18:
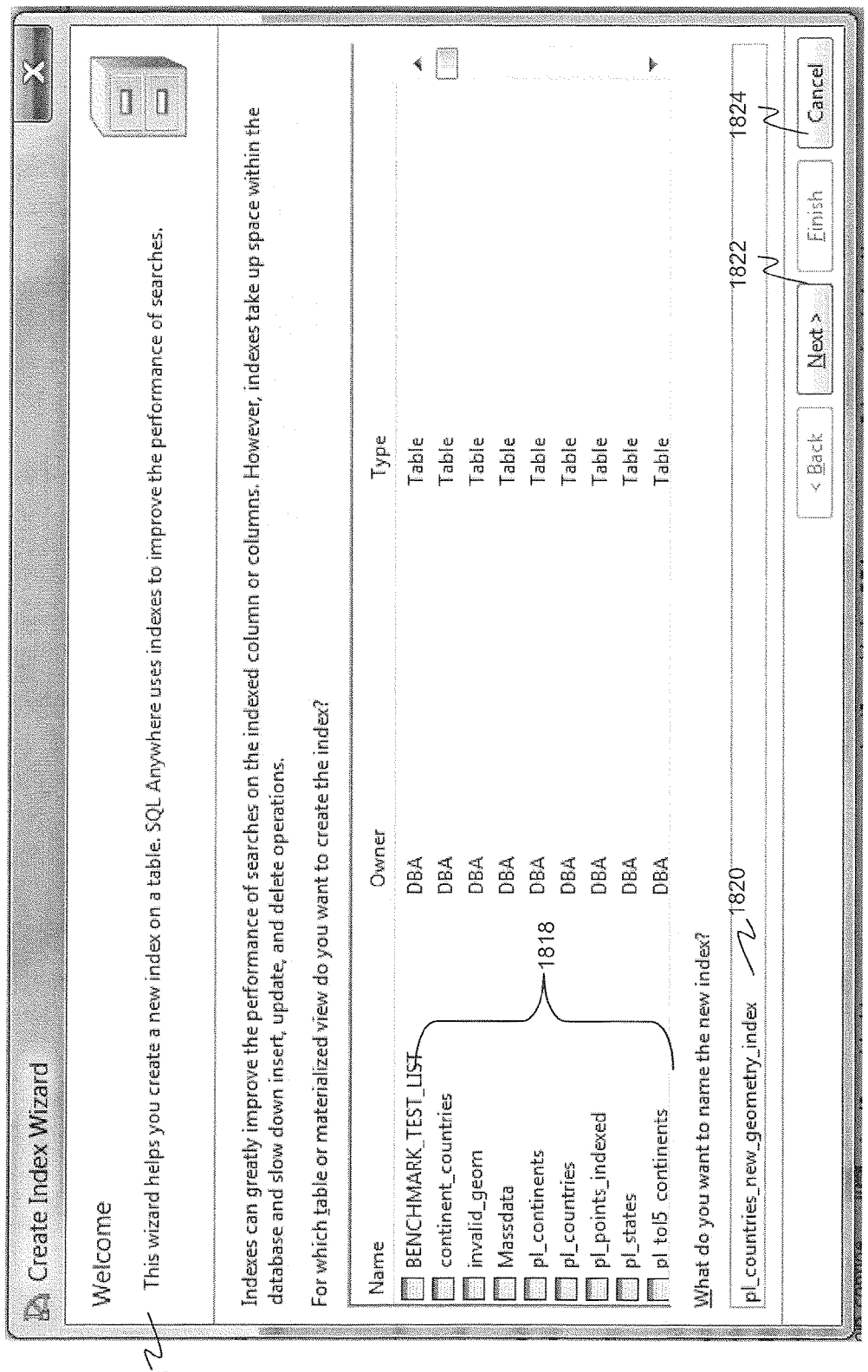

As shown in FIG. 18, create index wizard 1816 displays an object list 1818 of tables and materialized views that spatial indexes can be created for. In the example embodiment of FIG. 18, object list 1818 displays the object name, owner, and type (e.g., table or view). A name for the new index to be created can be entered in command area 1820. After entering a name for the new index, by selecting, using an input device (not shown), an object displayed in object list 1818 in conjunction with selecting Next button 1822, a user can navigate to the column selection interface illustrated in FIG. 19. Alternatively, by selecting, using an input device, Cancel button 1824, a user can exit create index wizard 1816.

Figure 19:
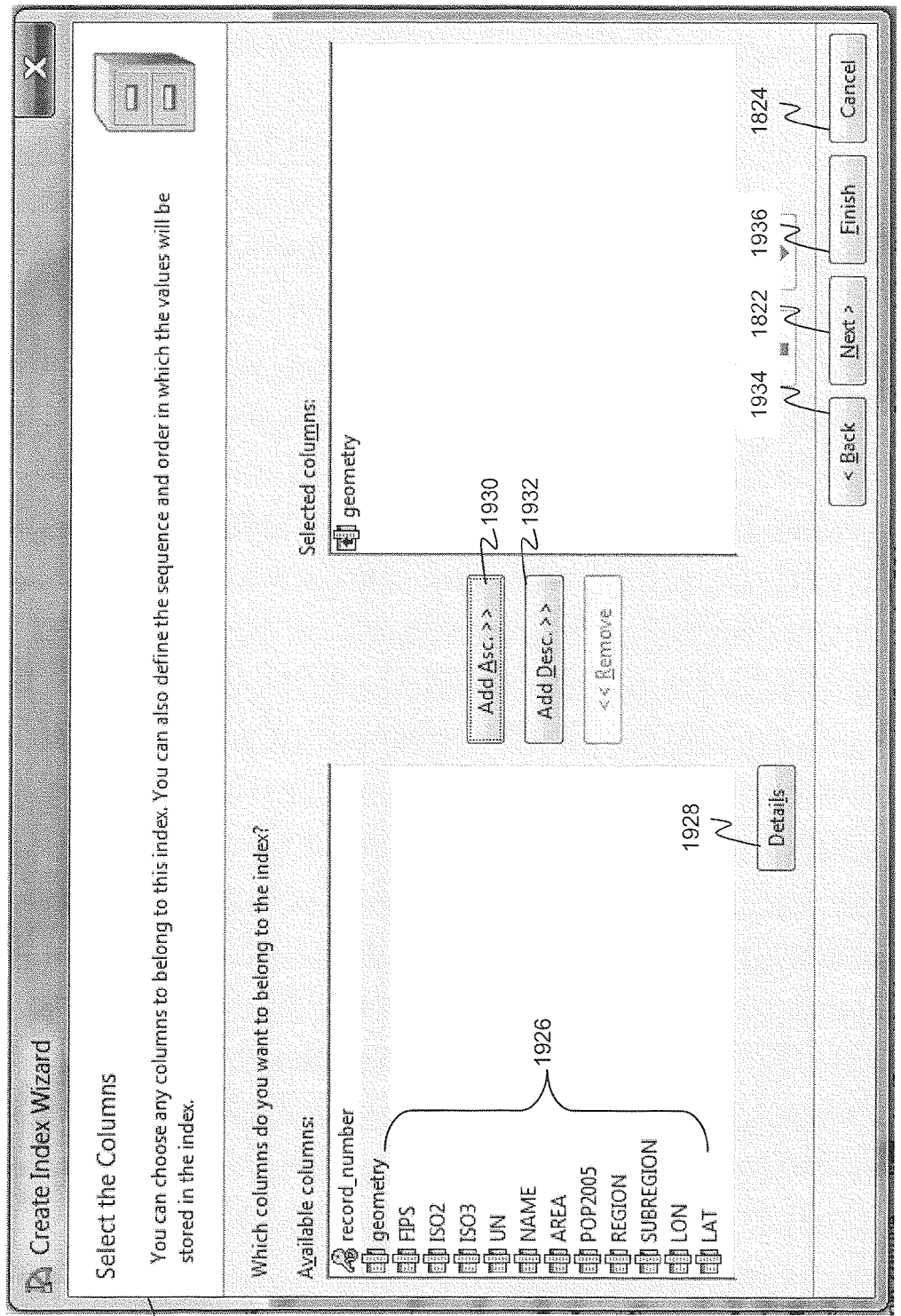

FIG. 19 shows a column selection interface for create index wizard 1816. By selecting one or more displayed columns in column list 1926 in conjunction with selecting either ascending button 1930 or descending button 1932, a user can define a sequence and order in which values will be stored in the new spatial index. By selecting, using an input device, one or more columns in column list 1926 in conjunction with details button, a user can invoke column details dialog 2038 illustrated in FIG. 20. By selecting, using an input device, Next button 1822, a user can navigate to the index summary interface illustrated in FIG. 21. Alternatively, by selecting, using an input device, Back button 1934, a user can navigate back to the first screen of create index wizard 1816 illustrated in FIG. 18 and described above. By selecting Finish button 1936, the user can create the index based upon the selections made in create index wizard 1816.

Figure 20:
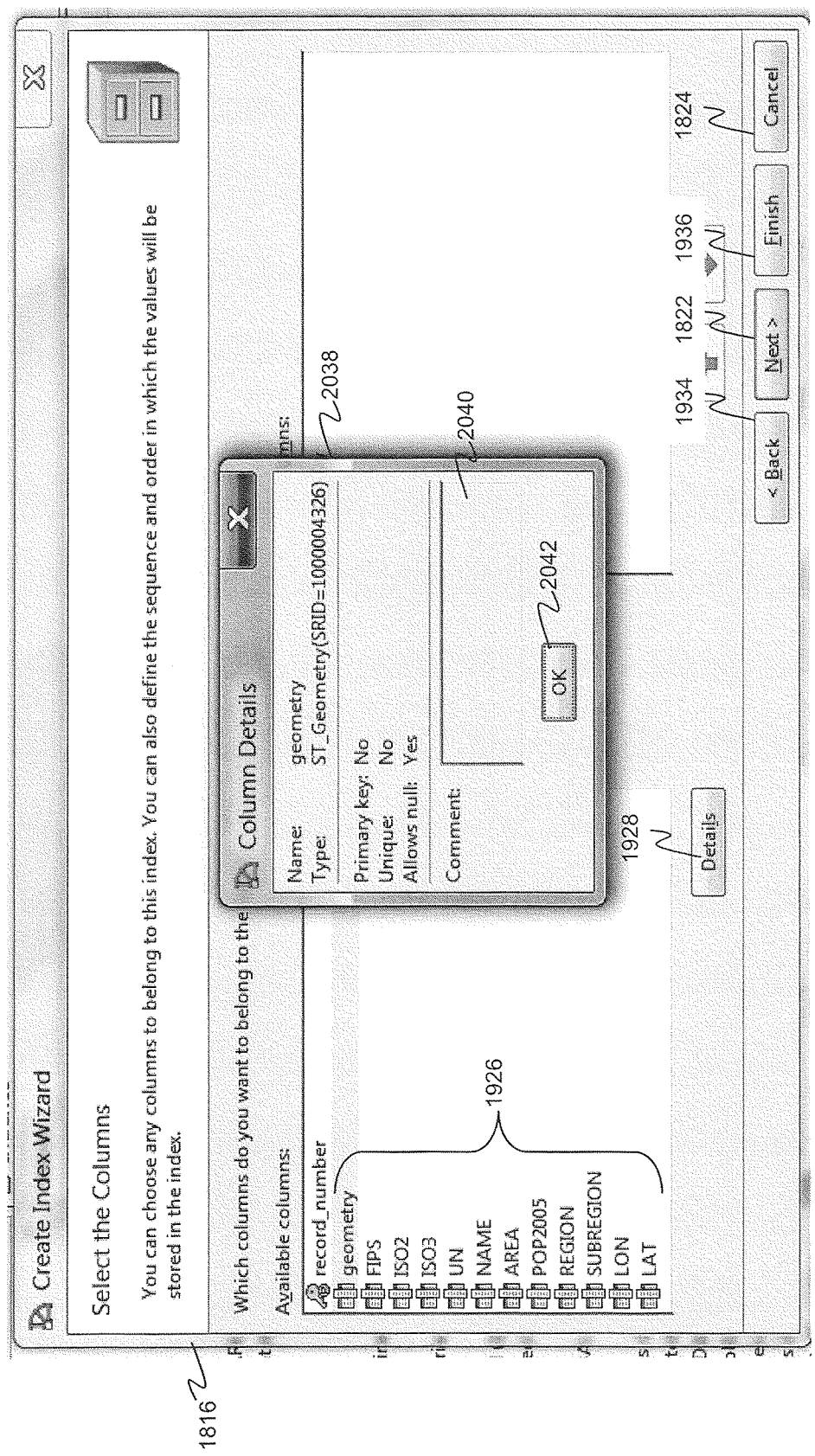

FIG. 20 illustrates column details dialog 2038 launched or overlaid within the column selection interface provided in FIG. 19. As shown in FIG. 20, column details dialog 2038 displays column properties such as, but not limited to, the column name, the data type (i.e., the spatial data type), and primary key, uniqueness, and null properties. Column details dialog 2038 further includes a comments area 2040 wherein any comments for the selected column are displayed. By selecting, using an input device, OK button 2042, a user can close column details dialog 2038. At this point, by selecting, using an input device, Next button 1822, a user can navigate to the index summary interface illustrated in FIG. 21.

Figure 21:
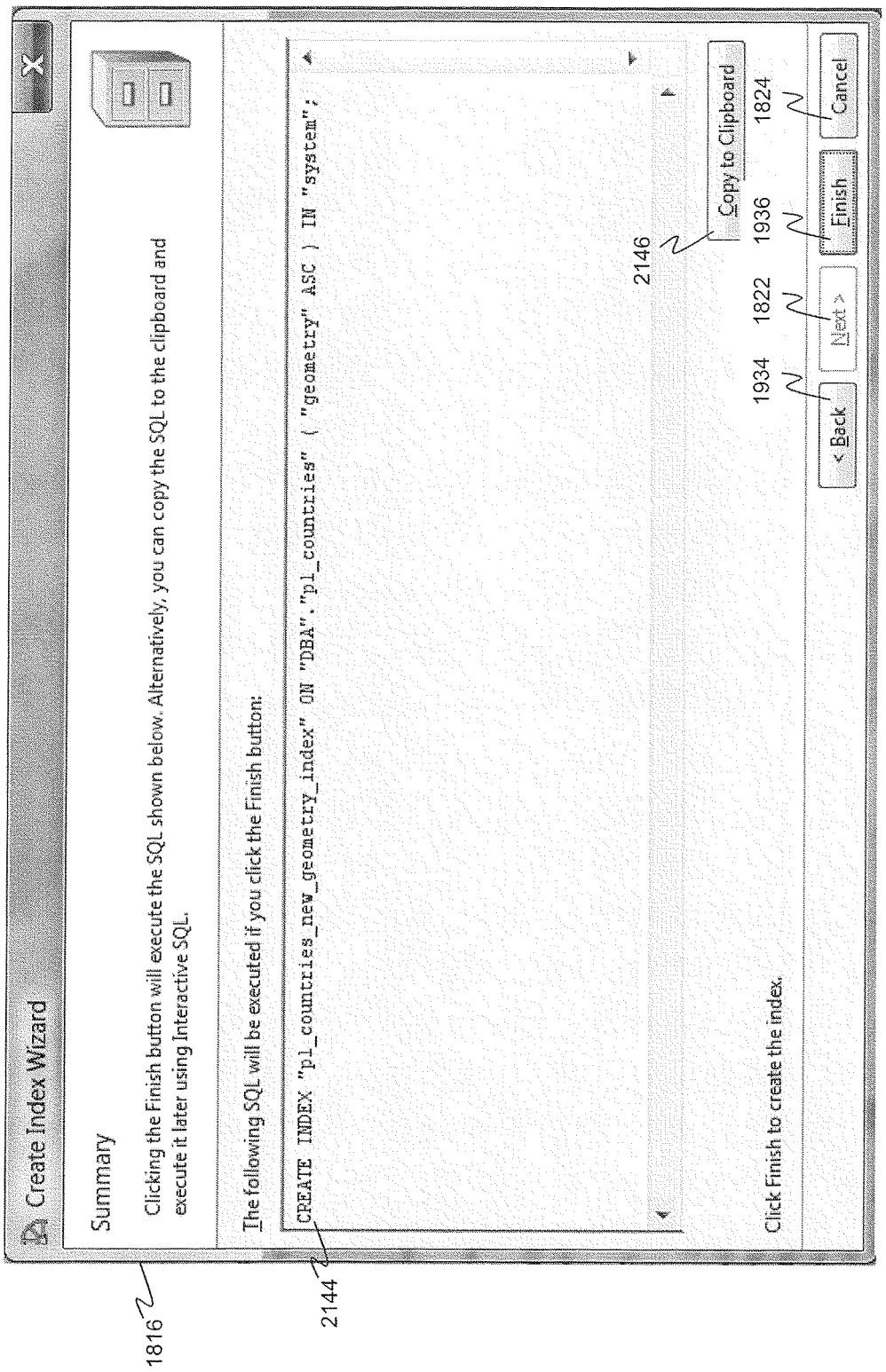

FIG. 21 illustrates an index summary page for create index wizard 1816. As shown in FIG. 21, the CREATE INDEX SQL statement corresponding to the spatial index to be created is displayed in code window 2144. By selecting, using an input device, Copy button 2146, a user may copy the CREATE INDEX statement (i.e., SQL code in the exemplary embodiment of FIG. 19) to a clipboard so that it may be saved in another application or for future reference. By selecting Finish button 1936, the user can create the index (i.e., cause the SQL statement displayed in code window 2144 to be executed by database system 100). Although a SQL CREATE INDEX statement is shown in the exemplary embodiment of FIG. 19, as would be appreciated by one of skill in the relevant arts, other programming languages and technologies can be used to create a spatial index.

Figure 22:
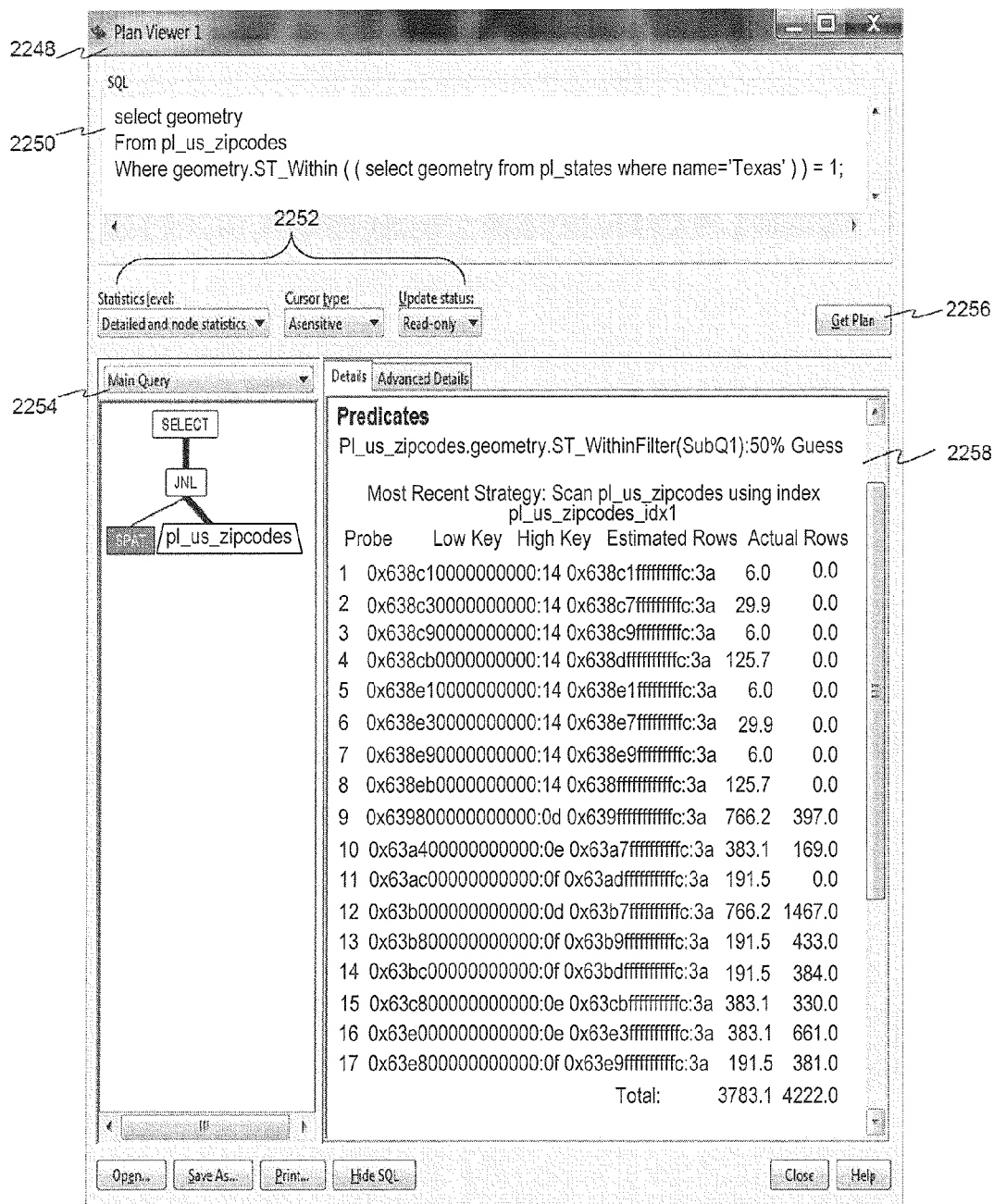
FIG. 22 illustrates an exemplary plan viewer GUI, wherein a query plan and probe strategy chosen for a particular query can be viewed, in accordance with an embodiment of the invention.

FIG. 22 illustrates an exemplary plan viewer GUI, wherein a query plan and probe strategy chosen for a particular query can be viewed, in accordance with an embodiment of the invention. As shown in FIG. 22 plan viewer 2248 displays a query (i.e., a SQL query in the provided exemplary embodiment) in query window 2250. Plan viewer 2248 also includes drop down menus 2252, which can be used to display one or more of node statistics, a cursor type, and an update status (i.e., read-only, read-write, etc.). By selecting, using an input device (not shown), Get Plan button 2256, a user can retrieve the query plan for the query displayed in query window 2250. For example, after selecting Get Plan button 2256, a graphical depiction of the query plan can be displayed in plan window 2254 and a detailed view 2258 of the query plan can be simultaneously displayed with in plan viewer 2248. In the embodiment provided in FIG. 22, a spatial predicate 260 and a list of probe results are displayed in detailed view 2258.

Figure 23:
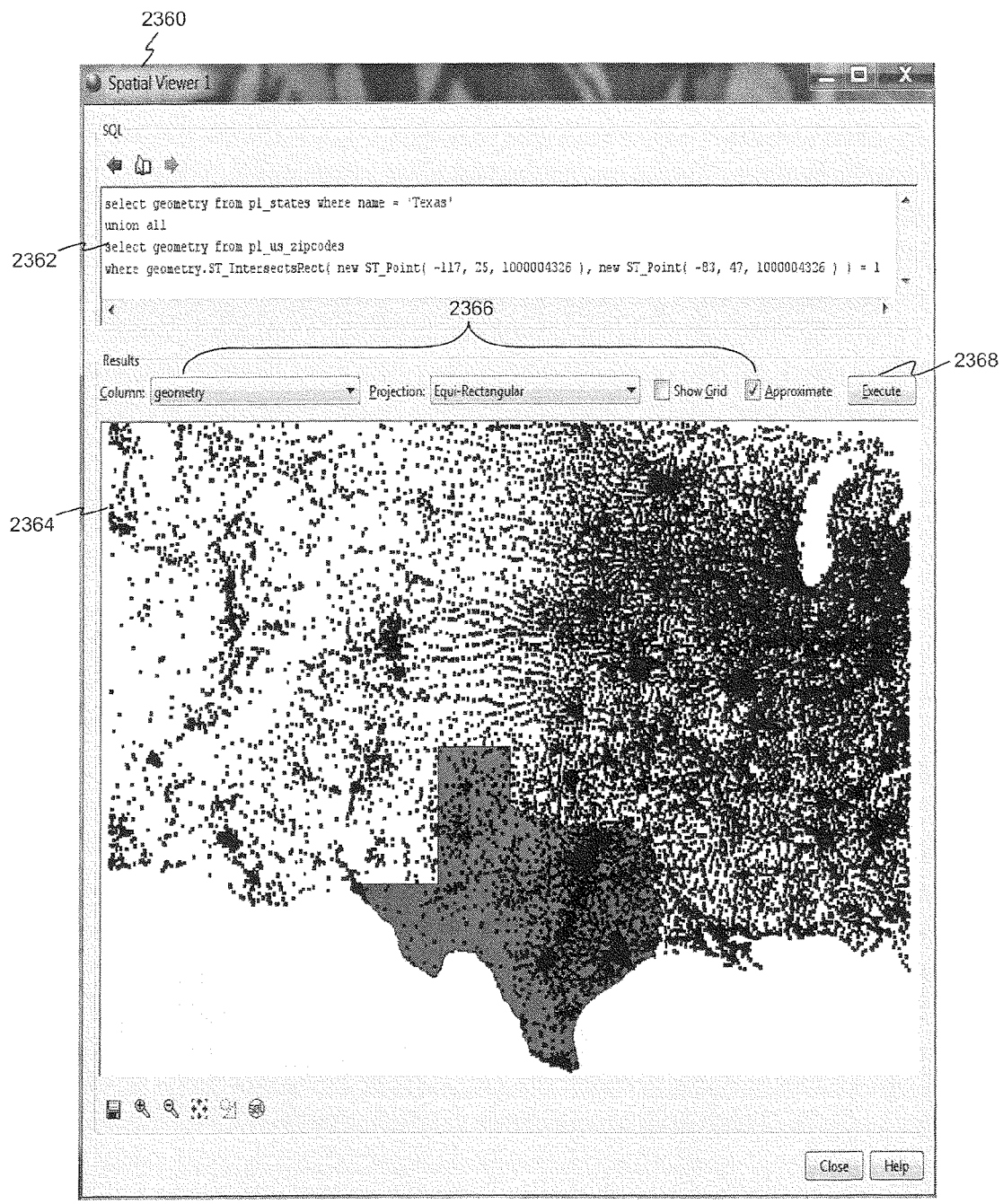
FIG. 23 illustrates an exemplary spatial viewer GUI, wherein a query object overlaid against spatial objects in the near vicinity can be viewed, in accordance with an embodiment of the invention.

FIG. 23 illustrates an exemplary spatial viewer GUI, wherein a query object overlaid against spatial objects in the near vicinity can be viewed, in accordance with an embodiment of the invention.

As shown in FIG. 23, a spatial viewer 2360 includes query window 2362 displaying a spatial query i.e., a SQL query for data in Texas in the provided exemplary embodiment). Although a SQL query is shown in FIG. 23, as would be understood by one of skill in the relevant art, a keyword search or natural language query equivalent such as "count the zip codes within the state of Texas" could be displayed in query window 2362. Spatial viewer 2360 includes drop down menus and checkboxes 2366 to show query results for selected columns, projection, within a grid, and/or approximate results. By selecting, using an input device, Execute button 2368, a user can cause the spatial query displayed in query window 2362 to execute.

Upon execution of the spatial query, spatial viewer 2360 displays the query results in results pane 2364. After results are displayed, a user can filter or alter the displayed results by selecting one or more of the drop down menus and checkboxes 2366 discussed above.

VII. Methods

Figure 24:
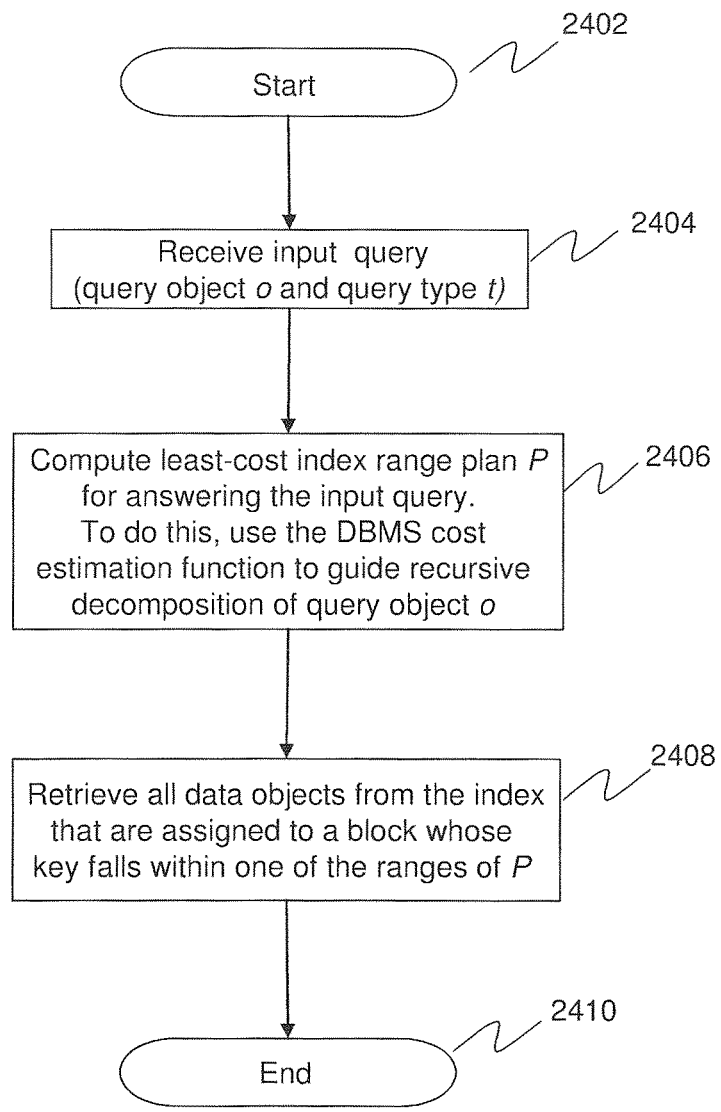
FIG. 24 is a flowchart illustrating a method for querying a quadtree index, according to an embodiment of the invention.
Figure 25:
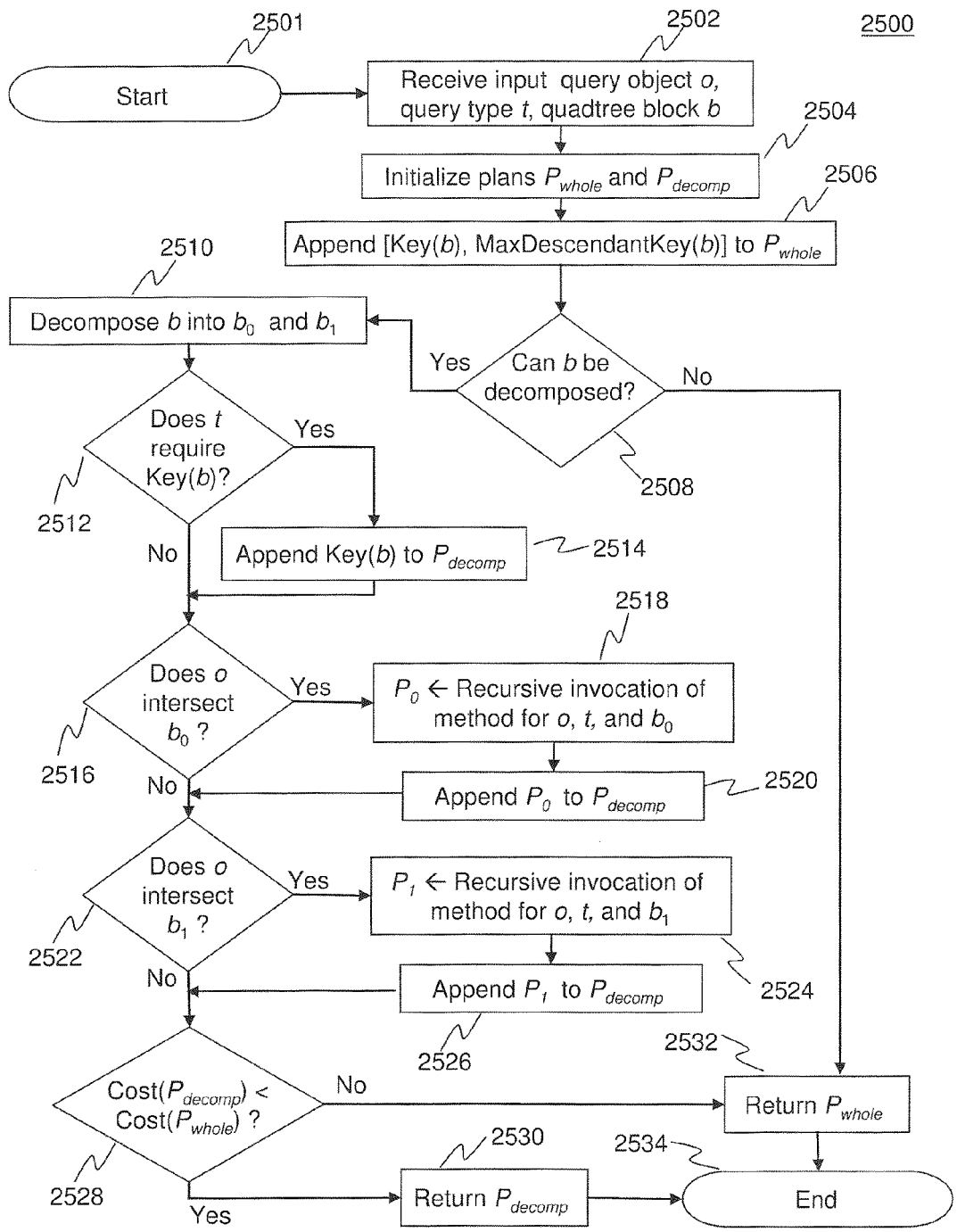
FIG. 25 is a flowchart illustrating a method for decomposing a spatial query, according to an embodiment of the invention.

FIGS. 24 and 25 are flowcharts of exemplary methods 2400 and 2500 illustrating steps by which: a spatial quadtree index is queried; and a query object is decomposed; respectively.

For ease of explanation, database system 100 of FIG. 1 and database server 130 of FIGS. 1 and 2, as described above will be used to describe methods 2400 and 2500, but they are not intended to be limited thereto. Note that the steps in the flowcharts do not necessarily have to occur in the order shown.

FIG. 24 illustrates the high level steps by which a spatial quadtree index is queried.

Method 2400 begins at step 2402 and proceeds to step 2404 in which in which a search phrase with spatial search terms is received from a client device such as client device 110a. In an embodiment, step 2404 comprises receiving a SQL query for spatial data. In an embodiment, step 2404 a query object o and query type t are received and/or determined based upon a received query. In an embodiment, the query type t is one of an intersection, containment, or within query. After query object o and query type t are determined from the received input, the process continues in step 2406.

In step 2406, a least-cost index range plan P is computed for the query received in step 2404. P is computed based upon input for the query. In the exemplary embodiment illustrated in FIG. 24, P is computed through use of a DBMS cost estimation function to guide recursive decomposition of query object o received/determined in step 2404. According to an embodiment, step 2406 is performed by executing algorithm 3 provided in Table 6 above. As discussed above with reference to Table 6, algorithm 3 is recursive and includes several steps (not shown in flowchart 2400). Accordingly, in an embodiment, computing the least-cost index range plan P in step 2406 may involve recursive iterations of the steps of algorithm 3 provided in Table 6 above. After the least-cost index range plan P is computed, control is passed to step 2408.

In step 2408, all data objects from the index that are assigned to a block b whose key falls within one of the ranges of P are retrieved. In an embodiment of the invention, the key of block b is a Morton key (i.e., MORTONKEY(b)).

After retrieval of all data objects from the index is complete, control is passed to step 2410, where method 2400 for querying a spatial quadtree index ends.

FIG. 25 illustrates steps for optimal query decomposition. In particular, method 2500 illustrates the steps for implementing algorithm 3 provided in Table 6 above. FIG. 25 shows the steps for carrying out algorithm 3 for one logical quadtree block. In the embodiment provided in FIG. 25, algorithm 3 is invoked on the root quadtree block. Method 2500 performs a recursive traversal of the logical space.

Method 2500 begins at step 2501 and proceeds to step 2502 in which a search phrase with spatial search terms is received from a client device such as client device 110a. In an embodiment, step 2502 comprises receiving a SQL query for spatial data. In an embodiment, step 2502 a query object o, query type t, and quadtree block b are received and/or determined based upon a received query. In an embodiment, the query type t is one of an intersection, containment, or within query. After query object o, query type t, and quadtree block b are determined from the received input, the process continues in step 2504.

In step 2504, index range plans $P_{whole}$ and $P_{decomp}$ are initialized. In an embodiment, step 2504 is performed by executing steps 1 and 8 of algorithm 3. Plan $P_{whole}$ denotes the plan for the whole block b; that is, which does not decompose block b but instead uses a single index range to retrieve all objects assigned to b or any of its descendants. Plan $P_{decomp}$ denotes the plan for the decomposition of block b; that is, formed by composing optimal plans which are computed for each component of b's decomposition. After plans $P_{whole}$ and $P_{decomp}$ are initialized, control is passed to step 2506.

In step 2506, the index key range [KEY(b), MAXDESCENDANTKEY(b)] is appended to $P_{whole}$, where MAXDESCENDANTKEY(b) denotes the maximal key among all descendants of block b determined in step 2502, and $P_{whole}$ is P the plan for the whole block b that was initialized in step 2504. In an embodiment, step 2504 is performed by executing step 4 of algorithm 3. After the range of [KEY(b), MAXDESCENDANTKEY(b)] is appended to $P_{whole}$, control is passed to step 2508.

In step 2508, an evaluation is made regarding whether block b received/determined in step 2502 can be decomposed. In an embodiment, this evaluation is made by executing step 5 of algorithm 3 to determine if the value returned by function DEPTH(b) is greater than or equal to a maximum block depth (e.g., MAXIMUMBLOCKDEPTH), wherein DEPTH(b) returns the number of bits in the Morton key for the block b received in step 2502. If it is determined that block b can be decomposed further, control is passed to step 25010. If it is determined that b cannot be decomposed (i.e., DEPTH(b) is less than MAXIMUMBLOCKDEPTH), then control is passed to step 2532.

In step 2510, block b is decomposed into child blocks $b_0$ and $b_1$ by partitioning b. In an embodiment, step 2510 is performed by executing step 9 of algorithm 3, which calls PARTITION(b) to return $(b_0, b_1)$. After the block b is decomposed into child blocks $b_0$ and $b_1$, the method proceeds to step 2512.

In step 2512, an evaluation is made regarding whether query type t received/determined in step 2502 requires a key for block b (i.e., KEY(b)). In an embodiment, this step is performed by executing steps 10-15 of algorithm 3. If it is determined that KEY(b) is needed, control is passed to step 2514. If it is determined that KEY(b) is not needed, then control is passed to step 2516.

In step 2514, the singleton range [KEY(b)] is appended to $P_{decomp}$, where $P_{decomp}$ is the index range plan for the decomposition of block b that was initialized in step 2504. In an embodiment, this step is performed by executing step 18 of algorithm 3. After KEY(b) is appended to $P_{decomp}$, the method proceeds to step 2516.

In step 2516, an evaluation is made regarding whether query object o received/determined in step 2502 intersects with child block $b_0$. In an embodiment, this step is performed by executing steps 13 and 21 of algorithm 3. If it is determined that o intersects with child block $b_0$, control is passed to step 2518. If it is determined that o does not intersect with child block $b_0$, then control is passed to step 2522.

In step 2518, the entire method (steps 2501-2534) is recursively invoked for query object o, query type t, and child block $b_0$ to determine the optimal index range plan for $b_0$, $P_0$. In an embodiment, step 2518 is performed by executing step 22 of algorithm 3. After $P_0$ is determined, the method proceeds to step 2520.

In step 2520, $P_0$, is appended to $P_{decomp}$. After $P_0$ is appended to $P_{decomp}$, control is passed to step 2522.

In step 2522, an evaluation is made regarding whether query object received/determined in step 2502 intersects with child block $b_1$. In an embodiment, this step is performed by executing steps 14 and 25 of algorithm 3. If it is determined that o intersects with child block $b_1$, control is passed to step 2524. If it is determined that o does not intersect with child block $b_0$, then control is passed to step 2528.

In step 2524, the entire method (steps 2501-2534) is recursively invoked for query object o, query type t, and child block $b_1$ to determine the optimal index range plan for $b_1$, $P_1$. In an embodiment, step 2524 is performed by executing step 27 of algorithm 3. After $P_1$ is determined, the method proceeds to step 2526.

In step 2526, $P_1$ is appended to $P_{decomp}$ and control is passed to step 2528.

In step 2528 an evaluation is made regarding whether the cost of using index range plan $P_{decomp}$ is less than $P_{whole}$. In an embodiment, this step is performed incrementally by executing steps 7, 19, 23, and 28 of algorithm 3. If it is determined that the cost of $P_{decomp}$ is less than the cost of $P_{whole}$, then control is passed to step 2530. If it is determined that the cost of $P_{decomp}$ is not less than the cost of $P_{whole}$, then control is passed to step 2532.

In step 2530, $P_{decomp}$ is returned as the optimal index range plan. In an embodiment of the invention, step 2530 is accomplished by executing step 30 of algorithm 3. After $P_{decomp}$ is returned, control is passed to step 2534 where method 2500 ends.

In step 2532, $P_{whole}$ is returned as the optimal index range plan. In an embodiment of the invention, step 2532 is accomplished by executing steps 20, 24, or 29 of algorithm 3. After $P_{whole}$ is returned, control is passed to step 2534 where method 2500 ends.

By completing steps 2501-2534, method 2500 enumerates all possible object decompositions for query object o received/determined in step 2502. As described above, this enumeration is accomplished by a single recursive depth-first traversal of the (logical) quadtree.

According to an embodiment, the steps of method 2500 are repeated as part of a recursive, optimal query decomposition, as described with reference to algorithms 2 and 3 in Tables 5 and 6, respectively. As discussed above with reference to algorithm 2 of Table 5, method 2500 is performed in order to minimize execution cost. For example, database system 100 must choose the decomposition of the query object o received in step 2502 that yields the optimal index range plan, where optimality is defined relative to the abstract plan-costing function Cost(P) provided by database system 100. Algorithm 2 in Table 5 illustrates a high-level description of an algorithm that can be used, in an embodiment, to perform part of method 2500. As discussed above, algorithm 2 can be applied to queries over any linearized quadtree index, independent of the chosen linearization or whether or not data objects are decomposed. The final, optimal plan P returned by steps 2530 and 2532 corresponds to a particular query decomposition, but this chosen decomposition is identified by the plan P.

Although not shown in FIG. 25, it is understood that in an embodiment of the invention, algorithm 3 provided in Table 6 above can be implemented for cases where o received in step 2502 has a very large number of distinct decompositions. Algorithm 3 can be used in order to efficiently implement a more specific, detailed version of algorithm 2 to use a quadtree index based upon a Morton key encoding. In this embodiment, the Morton key encoding contains non-decomposed data objects. As described above with reference to Table 6, in an embodiment, method 2500 can include the following operations besides the enumeration of all possible object decompositions by completing a single recursive depth-first traversal of the (logical) quadtree depicted in FIG. 25: efficiently assembling index range plan P incrementally at each step of the recursive traversal; and branch-and-bound pruning to prune the search space while retaining optimality of the search. In an embodiment, knowledge of the Morton key ordering is used during execution of algorithm 3 to merge adjacent key ranges whenever possible. As discussed above with reference to algorithm 3, monotonicity of the cost model can guarantee that plan costs increase as the traversal proceeds down the quadtree. In an embodiment, method 2500 be repeated recursively, but at each step in the recursion a step may backtrack whenever the cost of the current (partially constructed) plan exceeds the cost of a plan that spanned an entire ancestor block. In an embodiment, an upper bound can be set and used to make this backtracking decision (see, e.g., steps 7, 19, 23, and 28 of algorithm 3).

VIII. Example Computer System Implementation

Aspects of the present invention shown in FIGS. 1-25, or any part(s) or function(s) thereof, may be implemented using hardware, software modules, firmware, tangible computer readable media having instructions stored thereon, or a combination thereof and may be implemented in one or more computer systems or other processing systems.

Figure 26:
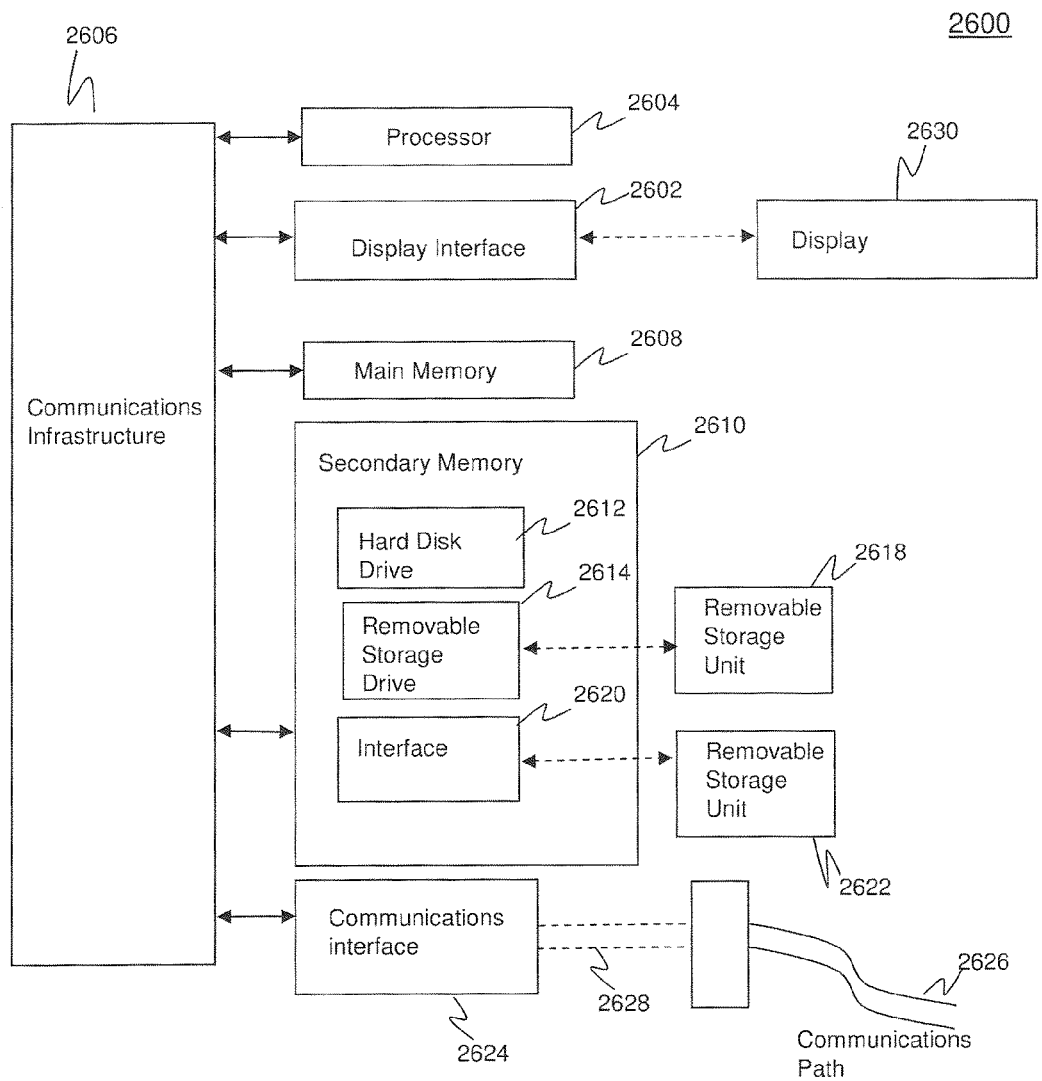
FIG. 26 is a diagram of an example computer system in which embodiments can be implemented.

FIG. 26 illustrates an example computer system 2600 in which embodiments of the present invention, or portions thereof, may be implemented as computer-readable code. For example, database system 100 of FIG. 1 and database server 200 of FIG. 2, can be implemented in computer system 2600 using hardware, software, firmware, non-transitory computer readable media having instructions stored thereon, or a combination thereof and may be implemented in one or more computer systems or other processing systems. Hardware, software, or any combination of such may embody any of the modules and components used to implement the GUIs of FIGS. 17-23.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 2600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 2604 may be a special purpose or a general purpose processor device. As will be appreciated by persons skilled in the relevant art, processor device 2604 may also be a single processor in a multi-core/multiprocessor system, such system operating alone, or in a cluster of computing devices operating in a cluster or server farm. Processor device 2604 is connected to a communication infrastructure 2606, for example, a bus, message queue, network, or multi-core message-passing scheme.

Computer system 2600 also includes a main memory 2608, for example, random access memory (RAM), and may also include a secondary memory 2610. Secondary memory 2610 may include, for example, a hard disk drive 2612, removable storage drive 2614. Removable storage drive 2614 may comprise a floppy disk drive, a magnetic tape drive, an optical disk drive, a flash memory, or the like. The removable storage drive 2614 reads from and/or writes to a removable storage unit 2618 in a well known manner. Removable storage unit 2618 may comprise a floppy disk, magnetic tape, optical disk, etc. which is read by and written to by removable storage drive 2614. As will be appreciated by persons skilled in the relevant art, removable storage unit 2618 includes a non-transitory computer usable storage medium having stored therein computer software and/or data.

In alternative implementations, secondary memory 2610 may include other similar means for allowing computer programs or other instructions to be loaded into computer system 2600. Such means may include, for example, a removable storage unit 2622 and an interface 2620. Examples of such means may include a program cartridge and cartridge interface (such as that found in video game devices), a removable memory chip (such as an EPROM, or PROM) and associated socket, and other removable storage units 2622 and interfaces 2620 which allow software and data to be transferred from the removable storage unit 2622 to computer system 2600.

Computer system 2600 may also include a communications interface 2624. Communications interface 2624 allows software and data to be transferred between computer system 2600 and external devices. Communications interface 2624 may include a modem, a network interface (such as an Ethernet card), a communications port, a PCMCIA slot and card, or the like. Software and data transferred via communications interface 2624 may be in the form of signals, which may be electronic, electromagnetic, optical, or other signals capable of being received by communications interface 2624. These signals may be provided to communications interface 2624 via a communications path 2626. Communications path 2626 carries signals and may be implemented using wire or cable, fiber optics, a phone line, a cellular phone link, an RF link or other communications channels.

In this document, the terms "computer program medium," "non-transitory computer readable medium," and "computer usable medium" are used to generally refer to media such as removable storage unit 2618, removable storage unit 2622, and a hard disk installed in hard disk drive 2612. Signals carried over communications path 2626 can also embody the logic described herein. Computer program medium and computer usable medium can also refer to memories, such as main memory 2608 and secondary memory 2610, which can be memory semiconductors (e.g. DRAMs, etc.). These computer program products are means for providing software to computer system 2600.

Computer programs (also called computer control logic) are stored in main memory 2608 and/or secondary memory 2610. Computer programs may also be received via communications interface 2624. Such computer programs, when executed, enable computer system 2600 to implement the present invention as discussed herein. In particular, the computer programs, when executed, enable processor device 2604 to implement the processes of the present invention, such as the stages in the methods illustrated by the high level flowchart of FIG. 4 and flowcharts 2400 and 2500 of FIGS. 24 and 25, discussed above. Accordingly, such computer programs represent controllers of the computer system 2600. Where the invention is implemented using software, the software may be stored in a computer program product and loaded into computer system 2600 using removable storage drive 2614, interface 2620, and hard disk drive 2612, or communications interface 2624.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

IX. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for determining an optimal execution plan for a spatial data query in a database management system, comprising:
   receiving a query for data related to a spatial data object;
   parsing the query to determine a query type and a key for the data object;
   determining quadtree blocks assigned to a block of the data object; recursively partitioning the quadtree blocks to derive keys for the quadtree blocks;
   performing data-directed range decomposition of the query;
   identifying an optimal index range plan for the query, wherein the identifying comprises:
   recursively traversing a logical quadtree depth-first, and
   assembling, incrementally at each recursive traversal, the index range plan for the query;
   pruning a search space for the query while retaining optimality of a search associated with the query, wherein the pruning is branch-and-bound pruning; and
   creating a spatial quadtree index based on the identifying.

2. The method of claim 1, wherein the database management system stores two dimensional (2D) data and wherein the spatial data object is a 2D planar object.

3. The method of claim 1, wherein the database management system supports data types representing one or more of:
   a point,
   a curve,
   a line (linestring),
   a surface,
   a polygon,
   a multi-surface polygon; or
   multi-curve linestrings.

4. The method of claim 1, wherein the database management system stores three dimensional (3D) data and wherein the spatial data object is a 3D object.

5. The method of claim 1, wherein the query type is one of:
   an intersection query;
   a containment query; or
   a within query.

6. The method of claim 5, wherein the query is expressed in structured query language (SQL) and wherein the query includes one of the following operators:
   INTERSECTS;
   CONTAINS; or
   WITHIN.

7. The method of claim 1, wherein the creating comprises executing a structured query language (SQL) CREATE INDEX command.

8. The method of claim 1, wherein the retrieving comprises quadtree block retrieval of ancestors of the block and descendants of the block.

9. The method of claim 1, wherein the keys for the quadtree blocks are Morton keys and the quadtree blocks are Morton blocks.

10. The method of claim 9, wherein the identifying comprises: enumerating object decompositions when recursively traversing the logical quadtree depth-first; and
   wherein the assembling further comprises using knowledge of a Morton key ordering to merge adjacent Morton key ranges; and
   pruning a search space for the query while retaining optimality of a search associated with the query.

11. The method of claim 10, further comprising:
   evaluating, at each recursive traversal, a cost of a current, partially constructed index range plan to determine if the cost exceeds the cost of a previously constructed index range plan that spanned an entire ancestor Morton block; and
   in response to determining that the cost exceeds the cost of the previously constructed index range plan, backtracking out of a current traversal of the logical quadtree.

12. The method of claim 11, wherein the evaluating determines if the cost of the current, partially constructed index range plan exceeds a predetermined upper bound.

13. The method of claim 12, wherein the upper bound is a tunable parameter.

14. The method of claim 1, wherein the data-directed range decomposition is cost-based.

15. The method of claim 1, wherein the quadtree index is a linear quadtree index.

16. The method of claim 1, wherein the identifying further comprises recursively searching for a least-cost index range plan.

17. A non-transitory computer readable storage medium having instructions stored thereon that, in response to execution by a computing device, cause the computing device to perform operations comprising:
   receiving a query for data related to a spatial data object;
   parsing the query to determine a query type and a quadtree block of the data object;
   initializing a whole index range plan for the quadtree block, wherein the whole index range plan comprises a single index range to retrieve all objects assigned to the quadtree block or any child quadtree blocks of the quadtree block;
   appending an index key range of the quadtree block to the whole index range plan;
   recursively partitioning the quadtree block to identify:
   child quadtree blocks assigned to the quadtree block; and
   child keys for the identified child quadtree blocks;

identifying a decomposition index range plan for the quadtree block, wherein the decomposition index range plan comprises optimal plans computed for the child quadtree blocks, the optimal plans computed by recursively traversing a logical quadtree depth-first, pruning a search space for the query while retaining optimality of a search associated with the query, wherein the pruning is branch-and-bound pruning, and assembling, incrementally at each recursive traversal, the optimal plan for the query;

determining a cost of using the whole index range plan and a cost of using the decomposition range plan;

designating, based on the determining, the least costly index range plan as an optimal index range plan for the received query.

18. A system for creating a spatial quadtree index comprising:

a database server comprising:

database storage storing a database comprising an initial spatial index and a plurality of tables comprising rows of spatial data;

a query parser to receive a query for spatial data, wherein the query parser determines a spatial data object and query type associated with the query;

a filter to determine a plurality of candidates for the query, wherein the candidates are determined using the initial spatial index to reduce the size of the plurality of candidates;

an execution unit configured to retrieve, from the database, quadtree blocks assigned to a block of the data object;

a partitioning module configured to recursively partition the quadtree blocks to derive keys for the quadtree blocks;

a query decomposition module configured to perform data-directed range decomposition of the query;

optimizer configured to identify an optimal index range plan for the query, recursively traverse a logical quadtree depth-first, prune a search space for the query while retaining optimality of a search associated with the query, wherein the prune is a branch-and-bound prune, and assemble, incrementally at each recursive traversal, the index range plan for the query;

an indexer configured to create a spatial quadtree index based on the optimal index range plan; and a display device configured to display representations of the optimal index range plan and the spatial quadtree index in an interactive user interface.

19. The system of claim 18, wherein the query decomposition module is further configured to perform the data-directed range decomposition when the query executes (at run time).

20. The system of claim 19, wherein the query decomposition module is further configured to perform the data-directed range decomposition using storage statistics for plurality of tables.

21. The system of claim 20, wherein the storage statistics are represented as one or more histograms.

* * * * *